(12) United States Patent
Hsieh et al.

(10) Patent No.: US 12,147,872 B2
(45) Date of Patent: Nov. 19, 2024

(54) QUANTUM NOISE PROCESS ANALYSIS METHOD AND APPARATUS, DEVICE, AND STORAGE MEDIUM

(71) Applicant: Tencent Technology (Shenzhen) Company Limited, Guangdong (CN)

(72) Inventors: Changyu Hsieh, Guangdong (CN); Yuqin Chen, Guangdong (CN); Yicong Zheng, Guangdong (CN); Kaili Ma, Guangdong (CN); Shengyu Zhang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/538,946

(22) Filed: Dec. 13, 2023

(65) Prior Publication Data

US 2024/0169228 A1    May 23, 2024

Related U.S. Application Data

(63) Continuation of application No. 17/174,665, filed on Feb. 12, 2021, now Pat. No. 11,893,453, which is a
(Continued)

(30) Foreign Application Priority Data

May 10, 2019    (CN) .......................... 201910390722.5

(51) Int. Cl.
*G06N 10/00*    (2022.01)
*G06N 7/01*    (2023.01)
*G06N 20/00*    (2019.01)

(52) U.S. Cl.
CPC .............. *G06N 10/00* (2019.01); *G06N 7/01* (2023.01); *G06N 20/00* (2019.01)

(58) Field of Classification Search
CPC ........... G06N 7/01; G06N 10/00; G06N 20/00
See application file for complete search history.

(56) References Cited

U.S. PATENT DOCUMENTS

| | | | |
|---|---|---|---|
| 2009/0240473 | A1 | 9/2009 | Ono et al. |
| 2019/0095811 | A1 | 3/2019 | Mezzacapo et al. |
| 2020/0134110 | A1 | 4/2020 | Ludwig |

FOREIGN PATENT DOCUMENTS

| | | | |
|---|---|---|---|
| CN | 103414447 A | | 11/2013 |
| CN | 107508676 A | | 12/2017 |

(Continued)

OTHER PUBLICATIONS

International Search Report and Written Opinion dated Jul. 15, 2020 for PCT/CN2020/084897 (10 pages).
(Continued)

*Primary Examiner* — Jack Chiang
*Assistant Examiner* — Aric Lin
(74) *Attorney, Agent, or Firm* — Crowell & Moring LLP

(57) ABSTRACT

This disclosure describes a quantum noise process analysis method, device, and storage medium, in the field of quantum processing technologies. The method may include performing quantum process tomography (QPT) on a quantum noise process of a target quantum system, to obtain dynamical maps of the quantum noise process, wherein the QPT involves at least one measurement of the target quantum. The method further includes extracting transfer tensor maps (TTMs) of the quantum noise process from the dynamical maps; and analyzing the quantum noise process according to the TTMs. The TTM is used for representing a dynamical evolution of the quantum noise process to reflect the law of evolution of the dynamical maps of the quantum noise process over time. As a result, richer and more comprehensive information about the quantum noise process can be obtained by analyzing the quantum noise process based on
(Continued)

the TTM of the quantum noise process than by pure QPT, thereby achieving a more accurate and more comprehensive analysis of the quantum noise process.

20 Claims, 13 Drawing Sheets

Related U.S. Application Data continuation of application No. PCT/CN2020/084897, filed on Apr. 15, 2020.

(56) References Cited

FOREIGN PATENT DOCUMENTS

| | | |
|---|---|---|
| CN | 107615237 A | 1/2018 |
| CN | 108072608 A | 5/2018 |
| CN | 108898829 A | 11/2018 |
| CN | 109004916 A | 12/2018 |
| CN | 110210073 A | 9/2019 |
| WO | WO 2017/200536 | 11/2017 |

OTHER PUBLICATIONS

Office Action issued on Chinese Patent Application 201910307225 on Dec. 21, 2021, 5 Pages.

Official action with search report issued on European application 20805042.7 on Jul. 12, 2022, 9 pages.

Preliminary Rejection issued on Korean application 10-2021-7011244 dated Jul. 20, 2022, 10 Pages including translation.

Notice of Reasons for Refusal, Office Action issued on Japanese application 2021-631175, dated Mar. 15, 2022, 2 pages.

Translation of Notice of Reasons for Refusal dated Mar. 15, 2022, 3 Pages.

Cerrillo, J. et al.; "Non-Markovian Dynamical Maps: Numerical Processing of Open Quantum Trajectories"; Phys. Rev. Lett. 112, 110401; 2014.

Cerrillo, Javier et al., "N on-Markovian Dynamical Maps: Numerical Processing of Open Quantum Trajectories", Massachusetts Institute of Technology, Published Mar. 17, 2014.

Chen, Yu-Qin et al., "Non-Markovian Noise Characterization with the Transfer Tensor Method", Tencent Quantum Laboratory, Tencent, Shenzhen, Guangdon, China 518077.

Emerson, Joseph et al., "Scalable noise estimation with random unitary operators", Journal of Optics B: Quantum and Semiclassical Optics, 7 (2005) 8347-8352.

Prousalis, Konstantinos; "Quantum noise simulation: A software module for QuCirDET"; 2017 6th International Conference on Modern Circuits and Systems Technologies; 4 pages; Dec. 31, 2017.

Ye, Bin et al.; "Dynamical suppression of Imperfections in the Quantum Simulation of the Quantum Baker's Map"; Control Theory and Application; pp. 515-520; May 5, 2009; Abstract.

Ying, Qi; "The theory of quantum tomography technology and its optical experiment research"; Chinese PhD Dissertation Database, Basic Science Edition, fol. 10, ISSN: 1674-022X, Section I and 11, pp. 10-11 (5 pages including Abstract translation); Oct. 15, 2018.

QUANTUM NOISE PROCESS ANALYSIS METHOD AND APPARATUS, DEVICE, AND STORAGE MEDIUM

RELATED APPLICATION

This application is a continuation of and claims the benefit of priority to U.S. patent application Ser. No. 17/174,665, filed on Feb. 12, 2021, which is a continuation of and claims priority to the PCT International Application No. PCT/CN2020/084897, filed with the National Intellectual Property Administration, PRC on Apr. 15, 2020, which claims priority to Chinese Patent Application No. 201910390722.5, filed with the National Intellectual Property Administration, PRC on May 10, 2019, all entitled "QUANTUM NOISE PROCESS ANALYSIS METHOD AND APPARATUS, DEVICE, AND STORAGE MEDIUM", which are incorporated herein by reference in their entireties.

FIELD OF THE TECHNOLOGY

Embodiments of this application relate to the field of quantum technologies, and in particular, to a quantum noise process analysis technology.

BACKGROUND OF THE DISCLOSURE

A quantum noise process is a quantum information pollution process caused by the interaction between a quantum system or quantum device with a bath or by the imperfection in quantum control.

In the related art, information about a dynamical map of a quantum noise process is extracted through quantum process tomography (QPT). The QPT is a mathematical description of inputting a group of standard quantum states to a noise channel and reconstructing a quantum noise process through a series of measurement processes.

The limited information about the quantum noise process obtained through pure QPT is insufficient to accurately and comprehensively analyze the quantum noise process.

SUMMARY

Embodiments of this application provide a quantum noise process analysis method and apparatus, a device, and a storage medium, to resolve the foregoing technical problem in the related art. The technical solutions are as follows:

According to an aspect, an embodiment of this application provides a quantum noise process analysis method, including:

performing quantum process tomography (QPT) on a quantum noise process of a target quantum system, to obtain dynamical maps of the quantum noise process;

extracting transfer tensor maps (TTMs) of the quantum noise process from the dynamical maps, the TTMs being used for representing a dynamical evolution of the quantum noise process; and analyzing the quantum noise process according to the TTMs.

According to another aspect, an embodiment of this application provides a quantum noise process analysis apparatus, including:

an obtaining module, configured to perform quantum process tomography (QPT) on a quantum noise process of a target quantum system, to obtain dynamical maps of the quantum noise process;

an extraction module, configured to extract TTMs of the quantum noise process from the dynamical maps, the TTMs being used for representing a dynamical evolution of the quantum noise process; and an analysis module, configured to analyze the quantum noise process according to the TTMs.

According to still another aspect, an embodiment of this application provides a computer device, including a processor and a memory, the memory storing at least one instruction, at least one program, a code set or an instruction set, the at least one instruction, the at least one program, the code set or the instruction set being loaded and executed by the processor to implement the foregoing quantum noise process analysis method.

According to yet another aspect, an embodiment of this application provides a computer-readable storage medium, storing at least one instruction, at least one program, a code set or an instruction set, the at least one instruction, the at least one program, the code set or the instruction set being loaded and executed by a processor to implement the foregoing quantum noise process analysis method.

According to still yet another aspect, an embodiment of this application provides a computer program product, when executed, the computer program product being configured to perform the foregoing quantum noise process analysis method.

The technical solutions provided in the embodiments of this application may include at least the following beneficial effects:

In the technical solutions provided in this application, QPT is performed on a quantum noise process, to obtain dynamical maps of the quantum noise process, and a TTM of the quantum noise process is further extracted from the dynamical maps of the quantum noise process. The TTM is used for representing a dynamical evolution of the quantum noise process, that is, reflecting the law of evolution of the dynamical maps of the quantum noise process over time. Compared with pure QPT, this application can obtain richer and more comprehensive information about the quantum noise process. Therefore, when the quantum noise process is analyzed based on the TTM of the quantum noise process, a more accurate and comprehensive analysis of the quantum noise process can be achieved based on the richer and more comprehensive information.

BRIEF DESCRIPTION OF THE DRAWINGS

To describe the technical solutions of the embodiments of this application more clearly, the following briefly describes the accompanying drawings for illustrating the embodiments. The accompanying drawings in the following description are merely examples, and a person of ordinary skill in the art may still derive other accompanying drawings according to these accompanying drawings without creative efforts.

DESCRIPTION OF EMBODIMENTS

Figure 1:
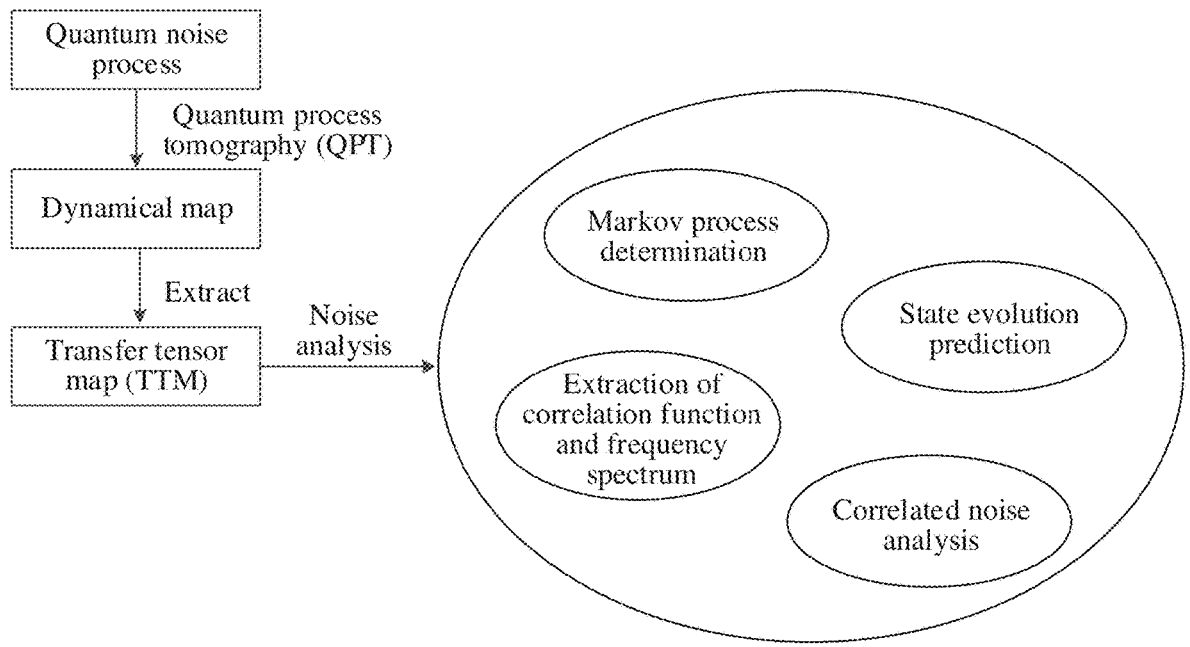
FIG. 1 is an overall flowchart of a technical solution of this disclosure.

To make the objectives, technical solutions, and advantages of this disclosure clearer, the following further describes implementations of this disclosure in detail with reference to the accompanying drawings.

Before the embodiments of this disclosure are described, some terms involved in this disclosure are explained first.

1. Quantum system: It is part of the entire universe, and its motion law follows the quantum mechanics.

2. Quantum state: All information of the quantum system is represented by a quantum state $\rho$. $\rho$ is a d×d complex matrix, where d is the quantity of dimensions of the quantum system.

3. Quantum noise process: It is a quantum information pollution process caused by interaction between the quantum system or quantum device with the bath or by imperfection in quantum control. Mathematically, this process is a channel represented by using a super-operator, and if the process is expanded to a higher dimensionality, the process may be represented by using a matrix.

4. Memory kernel: It is an operator acting on the quantum state, and includes all information about system decoherence triggered by the bath.

5. Second-order memory kernel: It is a second-order series expansion of the memory kernel in the coupling strength between the quantum system and the bath.

6. Second-order correlation function of noise: It is a correlation function of a system noise between two different time points, and is used for calculating a frequency spectrum of the noise.

7. Transfer tensor map (TTM): It is a map recursively extracted from dynamical maps of the quantum noise process, and this map encodes the memory kernel of the quantum system, and can be used for predicting a dynamical evolution of the quantum system and determining properties of the noise.

8. Quantum process tomography (QPT): It is a mathematical description of inputting a group of standard quantum states to a noise channel and reconstructing a quantum noise process through a series of measurement processes.

In quantum information processing, all information of the quantum system is represented by an evolution $\rho(t)$ of a quantum state over time t. $\rho(t)$ is a d×d complex matrix. Any quantum process, either a quantum information processing process or a quantum noise process, may be represented by using a dynamical map when the system and the bath are in a separable state initially:

$$\varepsilon(\rho) = \Sigma_k A_k \rho A_k^\dagger,$$

where $A_k$ is also a d×d matrix and meets $\Sigma_i A_i^\dagger A \leq I$, and represents a $k^{th}$ component of the influence of the bath on the quantum system, and I is an identity matrix. $A_k^\dagger$ represents a Hermitian conjugate, that is, a complex conjugate transpose, of $A_k$. Because of completeness of a finite-dimensional complex matrix space, an orthogonal basis matrix set $\{E_i\}$ in a d×d matrix space is defined, and then the following may be obtained:

$$A_i = \Sigma_m a_{im} E_m,$$

where $a_{im} \in \mathbb{C}$, $\mathbb{C}$ represents a complex set, $E_m$ is an element in $\{E_i\}$, and both i and m are positive integers.

In this way, the following may be obtained:

$$\varepsilon(\rho) = \sum_{m,n} \chi_{m,n} E_m \rho E_n^\dagger,$$

$$\text{where } \chi_{m,n} = \sum_i a_{mi} a_{ni}^*,$$

and is an element of a complex transformation matrix $\chi$ whose index is m, n, $E_n^\dagger$ represents a Hermitian conjugate of $E_n$, $E_n$ is an element in $\{E_i\}$, and $\rho$ represents an input state.

In the related art, a quantum noise process analysis method based on QPT is provided. $d^2 \times d^2$ linearly independent input states $\rho_j$ are used, and each input state $\rho_j$ is transferred to a quantum noise process to obtain an output state $\varepsilon(\rho_j)$. Because of completeness of the input states, the output state may be represented as a linear combination of the input states:

$$\varepsilon(\rho_j) = \Sigma_k c_{jk} \rho_k, \text{ where } c_{jk} \in \mathbb{C}.$$

where $\varepsilon(\rho_j)$ is an output quantum state obtained after a dynamical map of the quantum state $\rho_j$. In this way, by inputting the same quantum state $\rho_j$ a plurality of times and performing quantum state tomography on an output state, a summation coefficient $c_{jk}$ may be experimentally solved. A specific process is as follows:

$$E_m \rho_j E_n^\dagger = \Sigma_k B_{m,n,j,k} \rho_k,$$

where $B_{m,n,j,k}$ is a complex number, $B_{m,n,j,k}$ is considered as a complex matrix formed by indexes $\{m, n\}$ and $\{j, k\}$ and each of m, n, j, and k is a positive integer. Then, $$\Sigma_k c_{jk} \rho_k = \varepsilon(\rho_j) = \Sigma_{m,n,k} \chi_{m,n} B_{m,n,j,k} \rho_k.$$

Because $\{\rho_i\}$ is linearly independent, the following may be obtained:

$$c_{jk} = \Sigma_{m,n} \chi_{m,n} B_{m,n,j,k}.$$

By transposing $B_{m,n,j,k}$, the following may be obtained:

$$\chi_{m,n} = \Sigma_{j,k} B_{m,n,j,k}^{-1} c_{jk}.$$

$\chi_{m,n}$ includes all information about dynamical maps of the quantum noise process. Therefore, once $\chi_{m,n}$ is obtained through QPT, all the information about the dynamical maps of the quantum noise process is obtained.

However, the limited information about the quantum noise process obtained through pure QPT is insufficient to accurately and comprehensively analyze the quantum noise process. For example, whether the quantum noise process is a Markov process or a non-Markov process is not determined, a frequency spectrum of the quantum noise process is not obtained, and a correlated noise between different quantum devices in the quantum system is not analyzed.

To resolve the foregoing technical problems, an embodiment of this disclosure provides a quantum noise process analysis method. FIG. 1 is an overall flowchart of a technical solution of this disclosure. In the technical solution provided in this disclosure, QPT is performed on a quantum noise process, to obtain dynamical maps of the quantum noise process, a TTM of the quantum noise process is further extracted from the dynamical maps of the quantum noise process, and then the quantum noise process is analyzed according to the TTM. The TTM is used for representing a dynamical evolution of the quantum noise process, that is, reflecting the law of evolution of the dynamical maps of the quantum noise process over time. Therefore, richer and more comprehensive information about the quantum noise process can be obtained by analyzing the quantum noise process based on the TTM of the quantum noise process than by pure QPT, thereby achieving a more accurate and more comprehensive analysis of the quantum noise process.

The technical solution provided in this disclosure is applicable to analysis of a quantum noise process of any quantum system such as a quantum computer, secure quantum communication, the quantum Internet or another quantum system. The interference to the quantum system by quantum noise severely affects the performance of the quantum system, which is the primary barrier hindering the practical application of the quantum system. Therefore, analyzing the quantum noise process and understanding the properties of the noise are crucial for the development of practical quantum systems. In the technical solution provided in this disclosure, analyzing the quantum noise process based on the TTM of the quantum noise process may include, for example, the following analysis content as shown in FIG. 1: (1) Markov process determination, e.g., whether the quantum noise process is a Markov process or a non-Markov process can be determined, and whether a special noise suppression solution may be designed for a non-Markov noise, where the solution is, for example, suppressing the occurrence of noise through dynamical decoupling; (2) state evolution prediction, e.g., a state evolution of the quantum noise process may be predicted; (3) extraction of correlation function and frequency spectrum, e.g., a correlation function and a frequency spectrum of the quantum noise process may be obtained, facilitating the integration of a filter of a corresponding frequency band in the process of quantum device manufacturing; and (4) correlated noise analysis, e.g., a correlated noise between different quantum devices in the quantum system may be analyzed, to learn the source of the correlated noise and accordingly design a corresponding solution to suppress the correlated noise. Therefore, the technical solution provided in this disclosure can obtain richer and more comprehensive information about the quantum noise process, thereby providing more information to support the improvement in the performance of the quantum system.

Figure 2:
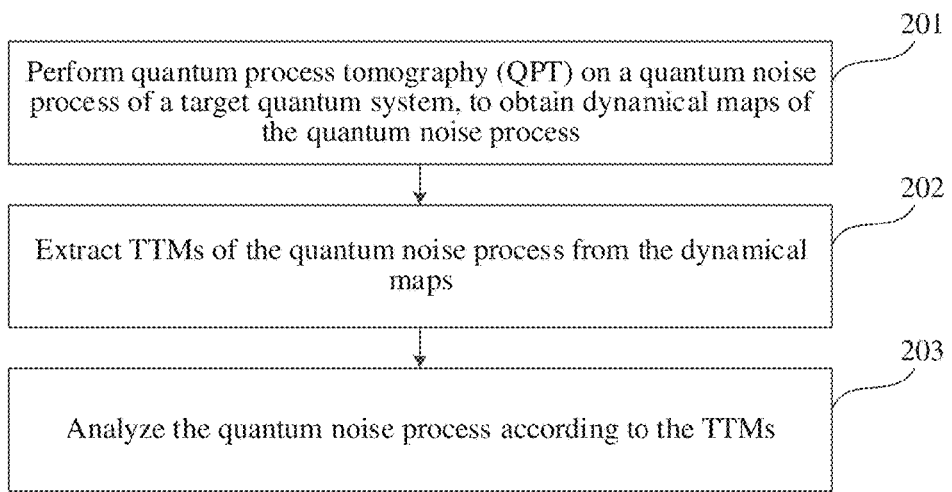
FIG. 2 is a flowchart of a quantum noise process analysis method according to an embodiment of this disclosure.

FIG. 2 is a flowchart of an example quantum noise process analysis method according to an embodiment of this disclosure. The method is applicable to a computer device, and the computer device may be any electronic device having data processing and storage capabilities, such as a personal computer (PC), a server, or a computing host. The method may include the following steps (step 201 to step 203):

Step 201. Perform quantum process tomography (QPT) on a quantum noise process of a target quantum system, to obtain dynamical maps of the quantum noise process.

The performing quantum process tomography (QPT) on a quantum noise process to obtain dynamical maps of the quantum noise process has been described above, so the details are not described herein again.

Optionally, in this embodiment, QPT may be performed on the quantum noise process at discrete time points. For example, if QPT is performed at K different time points, dynamical maps of the quantum noise process at the K time points may be obtained, K being an integer greater than or equal to 1. Optionally, among the K time points, intervals between neighboring time points may be equal. Alternatively, intervals between neighboring time points may also be not equal, which is not limited in this embodiment.

Step 202. Extract TTMs of the quantum noise process from the dynamical maps.

In this embodiment of this disclosure, the TTM of the quantum noise process is used for representing a dynamical evolution of the quantum noise process to reflect the law of evolution of the dynamical maps of the quantum noise process over time.

Optionally, if dynamical maps of the quantum noise process at the K time points are obtained in step 201, a possible implementation of step 201 may include calculating the TTMs of the quantum noise process at the K time points according to the dynamical maps of the quantum noise process at the K time points. In an exemplary embodiment, the TTMs at the K time points are extracted recursively. For example, a TTM $T_n$ of the quantum noise process at an $n^{th}$ time point is calculated according to the following formula:

$$T_n \equiv \varepsilon_n - \sum_{m=1}^{n-1} T_{n-m}\varepsilon_m,$$

where $T_1 = \varepsilon_1$, $\varepsilon_n$ represents a dynamical map of the quantum noise process at the $n^{th}$ time point, $\varepsilon_m$ represents a dynamical map of the quantum noise process at an $m^{th}$ time point, and $T_{n-m}$ represents a TTM of the quantum noise process at an $(n-m)^{th}$ time point, both n and m being positive integers.

Step 203. Analyze the quantum noise process according to the TTMs.

After the TTMs of the quantum noise process at the K time points are extracted, the quantum noise process may be analyzed accordingly.

In an exemplary embodiment, after $T_n$, is determined, the quantum noise process may be considered as a Markov process if the value of $|T_n|$ is negligibly small for $n>1$ according to the definition. Otherwise, the quantum noise process may be considered as a non-Markov process. That is, it may be determined that the quantum noise process is a Markov process when each of moduli of TTMs of the quantum noise process at first time points is less than a preset threshold, the first time points being time points other than the foremost time point of the K time points. It may otherwise be determined that the quantum noise process is a non-Markov process when a modulus of a TTM of the quantum noise process at a second time point is greater than the preset threshold, the second time point being at least one time point other than the foremost time point of the K time points.

By means of the above method, based on the TTMs of the quantum noise process, whether the quantum noise process is a Markov process or a non-Markov process can be determined, and a special noise suppression solution may be designed for a non-Markov noise, where the solution include, for example, suppressing the occurrence of noise through dynamical decoupling.

Additionally, compared with the dynamical map, a universal equation for describing the evolution of the quantum system in an open bath is a non-temporal localized quantum master equation, and can better reveal the mathematical structure of the quantum noise process. This equation is a differential-integral equation:

$$\frac{d\rho(t)}{dt} = L_s\rho(t) + \int_0^\tau ds \kappa(t-s)\rho(s),$$

where ρ(t) represents a quantum state of the quantum system at time t and is represented by using a d×d complex matrix; $L_s$ is a Liouville operator and represents a coherent part in the evolution process of the quantum system; s is an integral parameter; and κ(t) is a memory kernel including all information about system decoherence triggered by the bath. If $L_s$ and κ(t) of the quantum noise process are obtained, the noise mechanism may be completely understood. The basic idea of the technical solution of this disclosure is to calculate a TTM through an experiment and QPT, thereby extracting information about $L_s$ and κ(t).

In addition, a joint evolution of the quantum system and the bath is determined by a joint Hamiltonian. The joint Hamiltonian may be represented as:

$$H(t) = H_s + H_{sb}(t)$$
$$= H_s + \sum_{i,\alpha} g_i B_i^\alpha(t) \sigma_i^\alpha,$$

where $H_s$ is a Hamiltonian of the quantum system; $H_{sb}$ is an interactive Hamiltonian of coupling between the quantum system and the bath; $\sigma_i^\alpha$ is an $\alpha^{th}$ type of Pauli operator acting on an $i^{th}$ qubit of the system, both i and α being positive integer indexes; $B_i^\alpha(t)$ is an $\alpha^{th}$ type of bath operator coupled to the $i^{th}$ qubit; α=x, y, z represents three temporal-spatial directions; and $g_i$ is a coupling strength between the system and the bath.

The evolution of a state function of the quantum system follows:

$$\rho(t) = Tr_B\left[\exp_+\left(-i\int_0^t dsH(s)\right)\rho(0)\otimes\rho_B\exp_-\left(i\int_0^t dsH(s)\right)\right],$$
$$= \varepsilon(t)\rho(0)$$

where ρ(t) represents a quantum state of the quantum system at time t, ρ(0) represents an initial quantum state of the quantum system, $\rho_B$ is a quantum state of the bath, $Tr_B$ represents calculation of a partial trace of the degree of freedom of the bath, $\exp_+$, $\exp_-$ are clockwise and counterclockwise time-ordered exponential operators respectively, ε(t) represents a dynamical evolution of the quantum system at the time t, i is a unit pure imaginary number, and s is an integral parameter.

If time is discretized by $t_{k+1}-t_k=\delta t$ (k is a positive integer), a group of dynamical maps $\{\varepsilon_k\equiv\varepsilon(t_k)\}$ evolving over time may be defined. Experimentally, the dynamical maps may be obtained by performing QPT at different time points.

With reference to the foregoing definition about the formula of the TTM, by using $T_n$ to express $\varepsilon_n$ and substituting the expression into the formula of the foregoing state function, the following may be obtained:

$$\rho(t_n) = \sum_{m=1}^{n-1} T_m \rho(t_{n-m}),$$

where $\rho(t_n)$ represents a quantum state at an $n^{th}$ time point $t_n$, $\rho(t_{n-m})$ represents a quantum state at an $(n-m)^{th}$ time point $t_{n-m}$, and $T_m$ represents a TTM at an $m^{th}$ time point. This formula clearly indicates that in the presence of a noise, the state evolution of the quantum system depends on the historical evolution the quantum system. Generally, the dependence of the dynamical evolution on history does not exceed a certain time span. This means that the influence of the noise on the state may be precisely estimated by truncating a convolution of the foregoing formula and keeping K (where K is a positive integer) time points, that is, all items for which $l>t_K$ are discarded. In this way, through QPT on a dynamical map in a short period of time, a TTM in this period of time may be obtained. Then, an evolution of an open system in a long time may be predicted by using the TTM in this short period of time. The quantum state $\rho(t_n)$ at the $n^{th}$ time point $t_n$ may be calculated through the foregoing formula. In addition, the predicted quantum state may be directly compared with an experiment to verify the effectiveness of dynamics of the open system described through the TTM. In other words, this provides a preliminary basis for determining the effectiveness of the technical solution of this disclosure.

To sum up, in the technical solutions provided in this disclosure, QPT is performed on a quantum noise process, to obtain dynamical maps of the quantum noise process, and a TTM of the quantum noise process is further extracted from the dynamical maps of the quantum noise process. The TTM is used for representing a dynamical evolution of the quantum noise process to reflect the law of evolution of the dynamical maps of the quantum noise process over time. Compared with pure QPT, this disclosure can obtain richer and more comprehensive information about the quantum noise process. Therefore, when the quantum noise process is analyzed based on the TTM of the quantum noise process, a more accurate and comprehensive analysis of the quantum noise process can be achieved based on the richer and more comprehensive information.

Additionally, in the technical solution provided in this disclosure, the determination of whether the quantum noise process is a Markov process or a non-Markov process according to the TTM of the quantum noise process is further implemented; and the prediction, according to a TTM of the quantum noise process within a period of time, of a state evolution of the quantum noise process within a subsequent time is further implemented.

In an exemplary embodiment, after the TTM of the quantum noise process is extracted, a correlation function and a frequency spectrum of the quantum noise process may be further obtained accordingly. The process may include the following steps.

1. Extract a second-order memory kernel of the quantum noise process according to the TTMs of the quantum noise process when the quantum noise process is a steady noise.

For a steady noise (for example, Gaussian steady noise), the properties of the noise are determined by a correlation function of the noise process. The correlation function of the noise process may be calculated according to a second-order memory kernel of the noise process.

In this embodiment of this disclosure, for a quantum noise process, a second-order memory kernel of the quantum noise process is extracted according to the TTMs of the quantum noise process when the quantum noise process is a steady noise.

Considering that the time has been discretized and approximated to the second order of a time step δt, an approximation of the TTM may be obtained:

$$T_n=(1+L_s\delta t)\delta_{n,1}+\kappa(t_n)\delta t^2,$$

where δt is the time step, $\delta_{n,1}$ is a Kronecker function having a value of 1 when n=1 and a value of 0 in other cases, n being a positive integer; and $\kappa(t_n)$ is a value of the memory kernel at time $t_n$.

Moreover, according to the open system theory, a precise expression of a dynamical memory kernel $\kappa$ is:

$$\kappa(t,t')=PL(t)\exp_+[\int_{t'}^{t}ds\,QL(s)]QL(t')P,$$

where $P=\mathrm{Tr}_B\{\rho_{SB}\}\otimes\rho_B$ is a map operator, and $Q\rho_{SB}=\rho_{SB}-P\rho_{SB}$; L is a joint Liouville operator acting on the system and the bath, $\rho_{SB}$ is a joint state of the system and the bath, and $Q=I-P$ is a difference between P and an identity operator I.

Because a noise is preliminarily controlled through engineering in an ordinary quantum system, the coupling strength between the quantum system and the bath is relatively weak. When a target quantum system and the bath are in a weak coupling relationship, a second-order perturbation approximation may be established, and therefore the following may be obtained:

$$\kappa_2(t)(\bullet)\approx\langle L_{sb}(t)L_{sb}(0)\rangle(\bullet)=\Sigma_{\alpha\alpha'}[\sigma^\alpha,C_{\alpha\alpha'}(t)\sigma^{\alpha'}(t)(\bullet)-C^*_{\alpha\alpha'}(t)(\bullet)\sigma^{\alpha'}(t)],$$

where $\kappa_2(t)$ is a value of a second-order memory kernel at the time t, and $C^*_{\alpha\alpha'}(t)$ is a complex conjugate of $C_{\alpha\alpha'}(t)$. The foregoing expression is under the Schrödinger representation, and at the same time, it is assumed that a Hamiltonian of a joint system is time-invariant. The second-order correlation function $C_{\alpha\alpha'}(t)$ is defined as:

$$C_{\alpha\alpha'}(t)=g^2\langle \hat{B}^\alpha(t)\hat{B}^{\alpha'}(0)\rangle.$$

$C_{\alpha\alpha'}(t)$ is a bath correlation function. Based on the second-order perturbation, a dynamical map may be extracted from an experiment, and a TTM is obtained through QPT, thereby obtaining a memory kernel $\kappa_{exp}$ through approximation. That is, $\kappa_{exp}$ may be an approximate second-order memory kernel obtained through an experiment.

When the target quantum system and the bath are in a strong coupling relationship, the second-order perturbation is no longer a desirable approximation, and a better approximation can be obtained only when there are more high-order items, but a second-order memory kernel can still be extracted by extracting a TTM from experimental data. Specific steps are as follows: selecting N different parameters, performing an experiment on the quantum noise process, and extracting memory kernels respectively corresponding to the N different parameters from the experiment; and performing calculation according to the memory kernels respectively corresponding to the N different parameters, to obtain the second-order memory kernel of the quantum noise process.

First, an N-order truncated approximate memory kernel is defined:

$$\kappa(N,t)=\Sigma_{n=1}^{N}\kappa_{2n}(t),$$

It is assumed that a memory kernel of a system can be approximated by this approximate memory kernel. Then it is assumed that there is a parameter-adjustable system, parameters of the system may be adjusted in each experiment, and a Hamiltonian of the system is:

$$H_s=\omega_{s,i}\sigma^z,$$

where i represents an experiment performed by selecting an $i^{th}$ parameter, and $\sigma^z$ is a Pauli z operator $$\begin{pmatrix} 1 & 0 \\ 0 & -1 \end{pmatrix}.$$

For the selected parameter $\omega_{s,i}$ (where $\omega_{s,i}$ belongs to an interval that the experiment can reach), the Hamiltonian is normalized, and the following may be obtained:

$$\tilde{H}=\sigma^z+g\tilde{H}_{sb}(t),$$

where $\tilde{H}$ is the normalized Hamiltonian, and $g\propto 1/\omega_{s,i}$. By performing an experiment on N different $\omega_{s,i}$, a group of memory kernels without physical units may be constructed, with the relationship being as follows:

$$\tilde{\kappa}_{2n,i}(t)=\gamma_i^{2n}\tilde{\kappa}_{2n,0}(t),$$

where $\gamma_i=\omega_{s,0}/\omega_{s,i}$ is a normalized parameter, and $\tilde{\kappa}_{2n,i}$ represents a 2n-order memory kernel in the case of $\omega_{s,i}$. In this way, the following matrix may be defined:

$$A=\begin{bmatrix} 1 & 1 & \cdots & 1 \\ \gamma_1^2 & \gamma_1^2 & \cdots & \gamma_1^{2N} \\ \vdots & \vdots & \cdots & \vdots \\ \gamma_{N-1}^2 & \gamma_{N-1}^4 & \cdots & \gamma_{N-1}^{2N} \end{bmatrix}.$$

In addition, the following equation is satisfied:

$$A[\tilde{\kappa}_{2,0}\ \ldots\ \tilde{\kappa}_{2N,0}]^T=[\tilde{\kappa}(1)\ \ldots\ \tilde{\kappa}(N)]^T,$$

where A is an N-order normalized parameter matrix, and a memory kernel on the right side of the equation may be directly extracted from an experiment through QPT and data processing. Because A is a full-rank matrix, a second-order memory kernel is naturally obtained by solving the linear equation to obtain 2-order to N-order memory kernels without physical units.

2. Calculate a correlation function of the quantum noise process according to the second-order memory kernel of the quantum noise process.

Optionally, the correlation function $C_{\alpha\alpha'}$ of the quantum noise process may be numerically extracted according to the following formula:

$$\arg\min_{C_{\alpha\alpha'}(t_n)} \left\{|\kappa_2(t_n;C_{\alpha\alpha'}(t_n))-\kappa_{exp}(t_n)|+(1+\delta_{t_n,t_0})\lambda_n\sum_{\alpha\alpha'}|C_{\alpha\alpha'}(t_n)-C_{\alpha\alpha'}(t_{n-1})|\right\},$$

where $\kappa_2$ represents the second-order memory kernel of the quantum noise process, $t_n$ represents the $n^{th}$ time point, $C_{\alpha\alpha'}(t_n)$ is a second-order correlation function at the $n^{th}$ time point $t_n$, $\kappa_{exp}$ represents an approximate second-order memory kernel obtained through an experiment, $\delta_{t_n,t_0}$ is a Kronecker function (having a value of 1 when n=0 and a value of 0 in other cases), $\lambda_n$ is an adjustable parameter, and $C_{\alpha\alpha'}(t_{n-1})$ is a second-order correlation function at an $(n-1)^{th}$ time point $t_{n-1}$. $\lambda_n$ is used for ensuring that after the target function is minimized, the correlation function can still be continuous. $\lambda_n$ may be determined by first selecting an initial value and observing the value of the target function followed by iterative adjustments, so as to render the selection of the value of $\lambda_n$ robust.

Optionally, for a non-Gaussian steady noise, only a correlation function higher than 2-order can fully represent statistical properties of the noise. Obtaining of a second-order correlation function of a noise by solving this linear equation $A[\tilde{\kappa}_{2,0}\ \ldots\ \tilde{\kappa}_{2N,0}]^T=[\tilde{\kappa}(1)\ \ldots\ \tilde{\kappa}(N)]^T$ has been described above. If a non-Gaussian steady noise is processed, it may be assumed that a memory kernel of the noise is written as:

$$\kappa(N,t)=\Sigma_{n=2}^{N}\kappa_n(t).$$

Based on this more generalized memory kernel, the following may be obtained according to the solution described above:

$$A[\tilde{\kappa}_{2,0} \ldots \tilde{\kappa}_{N,0}]^T=[\tilde{\kappa}(1) \ldots \tilde{\kappa}(N)]^T.$$

By solving this linear equation, second-order and higher-order correlation functions may be obtained.

3. Perform a Fourier transform on the correlation function of the quantum noise process, to obtain a frequency spectrum of the quantum noise process.

Once the correlation function of the quantum noise process is obtained, a Fourier transform may be performed on the correlation function, to obtain a frequency spectrum $J_{\alpha\alpha'}(\omega)$ of the quantum noise process:

$$J_{\alpha\alpha'}(\omega) = \frac{1}{2}\int_{-\infty}^{\infty} dt e^{i\omega t}[C_{\alpha\alpha'}(t) - C_{\alpha\alpha'}^*(t)].$$

This method of obtaining the frequency spectrum of the quantum noise process is not limited by whether the noise is a quantum noise (the system has a feedback to the noise source) or a classical noise, and is not limited by a particular noise type.

To sum up, in the technical solution provided in this disclosure, after the TTM of the quantum noise process is extracted, the correlation function and the frequency spectrum of the quantum noise process may be further obtained accordingly, facilitating the integration of a filter of a corresponding frequency band in the process of quantum device manufacturing.

In an exemplary embodiment, after the TTM of the quantum noise process is extracted, a correlated noise between different quantum devices in the target quantum system may be further analyzed accordingly to learn the source of the correlated noise. The process may include the following steps.

1. Calculate, for s quantum devices included in the target quantum system, a correlated TTM among the s quantum devices according to TTMs respectively corresponding to the s quantum devices, s being an integer greater than 1.

2. Analyze a source of a correlated noise among the s quantum devices according to the correlated TTM.

A quantum system may include a plurality of quantum devices. A qubit is the simplest quantum device, including only two quantum states. By using TTMs, a noise correlation between the plurality of quantum devices in the same quantum system can be completed. The following mainly describes an example scenario where there are two quantum devices, and the same applies to other scenarios. For example, according to the method provided in this embodiment of this disclosure, a noise correlation between any two quantum devices, or a noise correlation between any three or more quantum devices can also be determined.

Dynamical maps of any two quantum systems (or quantum devices) may be decomposed as follows:

$$\mathcal{E}_n \equiv \mathcal{E}_{n,1} \otimes \mathcal{E}_{n,2} + \delta\mathcal{E}_n,$$
$$= \overline{\mathcal{E}}_n + \delta\mathcal{E}_n,$$

where $\mathcal{E}_{n,1}$ represents a dynamical map of a first quantum device, $\mathcal{E}_{n,2}$ represents a dynamical map of a second quantum device, and $\delta\mathcal{E}_n$ is an unseparated part representing the influence of a correlated noise. In the foregoing decomposition of dynamical maps, a dynamical map $\mathcal{E}_n \to \chi_n$ may be expressed in the form of Choi matrix, that is, $\chi_n$ is a Choi matrix being an equivalent representation of the dynamical map, and a trace of the Choi matrix is calculated as follows:

$$Tr\chi_n = \chi_{n,i}(i,\bar{i})=(1,2), \text{ or } (i,\bar{i})=(2,1).$$

Then, a Choi matrix $\chi_{n,i}$ of a single quantum device is expressed back as a dynamical map $\mathcal{E}_{n,i}$. Dynamical maps $\mathcal{E}_n$ of two quantum devices may both be obtained by performing joint QPT on the two quantum devices. $\delta\mathcal{E}_n$ may be used for analyzing the correlated noise. In the case of second-order perturbation, a modulus of $\delta\mathcal{E}_n$ is usually much less than that of $\overline{\mathcal{E}}_n$. In a non-perturbative area, modulus values of $\delta\mathcal{E}_n$ and $\overline{\mathcal{E}}_n$ may be equivalent, or even $|\delta\mathcal{E}_n|$ is much greater than $|\overline{\mathcal{E}}_n|$. Therefore, pure QPT can provide a preliminary determination on the strength of the correlated noise. However, it is rather difficult analyze the source of the correlated noise because all data is mixed together. Usually, sources of the correlated noise between two quantum devices include: (1) a correlated noise generated from direct coupling between the two quantum devices; (2) a correlated noise induced by a shared bath of the two quantum devices; or (3) a combination thereof.

An embodiment of this disclosure provides a correlated noise analysis method based on a TTM. By this method, more information about a correlated noise may be obtained. First, a separable TTM is calculated according to $\overline{\mathcal{E}}_n$:

$$\overline{T}_n = \overline{\mathcal{E}}_n - \sum_{m=1}^{n-1} \overline{T}_{n-m}\overline{\mathcal{E}}_m, \text{ and}$$

$$T_n = \overline{T}_n + \delta T_n,$$

where $\overline{T}_1=\overline{\mathcal{E}}_1$, and $\delta T_n$ is a noise correlation in transfer tensor map. Similarly, $\delta T_n$ may be decomposed into:

$$\delta T_n = \delta L \delta t \delta_{n,1} + \delta\kappa_n \delta t^2,$$

where the Liouville super-operator $\delta L$ reveals whether there is a correlated noise generated from direct coupling between two quantum devices, and $\delta\kappa_n$ represents a correlated noise induced by a shared bath. It can be found that a coupling increment caused by $\delta L$ is in a linear relationship with $\delta t$, and a coupling increment caused by $\delta\kappa_n$ is in a linear relationship with $\delta t^2$. By selecting two different time steps $\delta t$ and $\delta t'$, two different dynamical maps $\varepsilon_1$ and $\varepsilon'_1$ may be generated, and then the source of the correlated noise is determined. Considering that the correlated noise has significant influence on fault-tolerant quantum computing, the technical solution of this disclosure can provide a better understanding of the correlated noise and provide guidance on how to perform control, so as to design different noise suppression solutions.

For example, through QPT, a joint dynamical map $\varepsilon_n$ of two quantum devices in the target quantum system may be obtained, a TTM $T_n$ is further obtained, then $\varepsilon_{n,1}$ and $\varepsilon_{n,2}$ may be obtained by calculating traces for the two quantum devices according to $\varepsilon_n$ respectively, and $\bar{\varepsilon}_n = \varepsilon_{n,1} \otimes \varepsilon_{n,2}$. Then, $\overline{T}_n$ is obtained through $$\overline{T}_n = \bar{\varepsilon}_n - \sum_{m=1}^{n-1} \overline{T}_{n-m} \bar{\varepsilon}_m.$$

Finally, $\delta T_n = T_n - \overline{T}_n = \delta L \delta t \delta_{n,1} + \delta \kappa_n \delta t^2$.

Then, considering two different time steps $\delta t$ and $\delta t'$:

$$\begin{cases} \delta T_n = \delta L \delta t \delta_{n,1} + \delta \kappa_n \delta t^2 \\ \delta T'_n = \delta L \delta t' \delta_{n,1} + \delta \kappa_n \delta t'^2 \end{cases},$$

$\delta L$ and $\delta \kappa_n$ are calculated respectively.

To sum up, in the technical solution provided in this disclosure, after the TTM of the quantum noise process is extracted, a correlated noise between different quantum devices in the target quantum system may be further analyzed accordingly, to learn the source of the correlated noise and design a corresponding solution to suppress the correlated noise.

To further verify the effectiveness of the technical solution of this disclosure, numerical analysis is performed for a typical model. After this, on IBM Quantum Experience (which is a quantum computing cloud platform provided by IBM), an attempt is made to perform an experiment and observation on a real superconducting qubit and extract information about a noise process from the real superconducting qubit by using the technical solution of this disclosure.

Results of numerical analysis for the typical model are as follows:

Case 1: Numerical Simulation of a Single Qubit Under Pure Phase Decoherence

Figure 3:
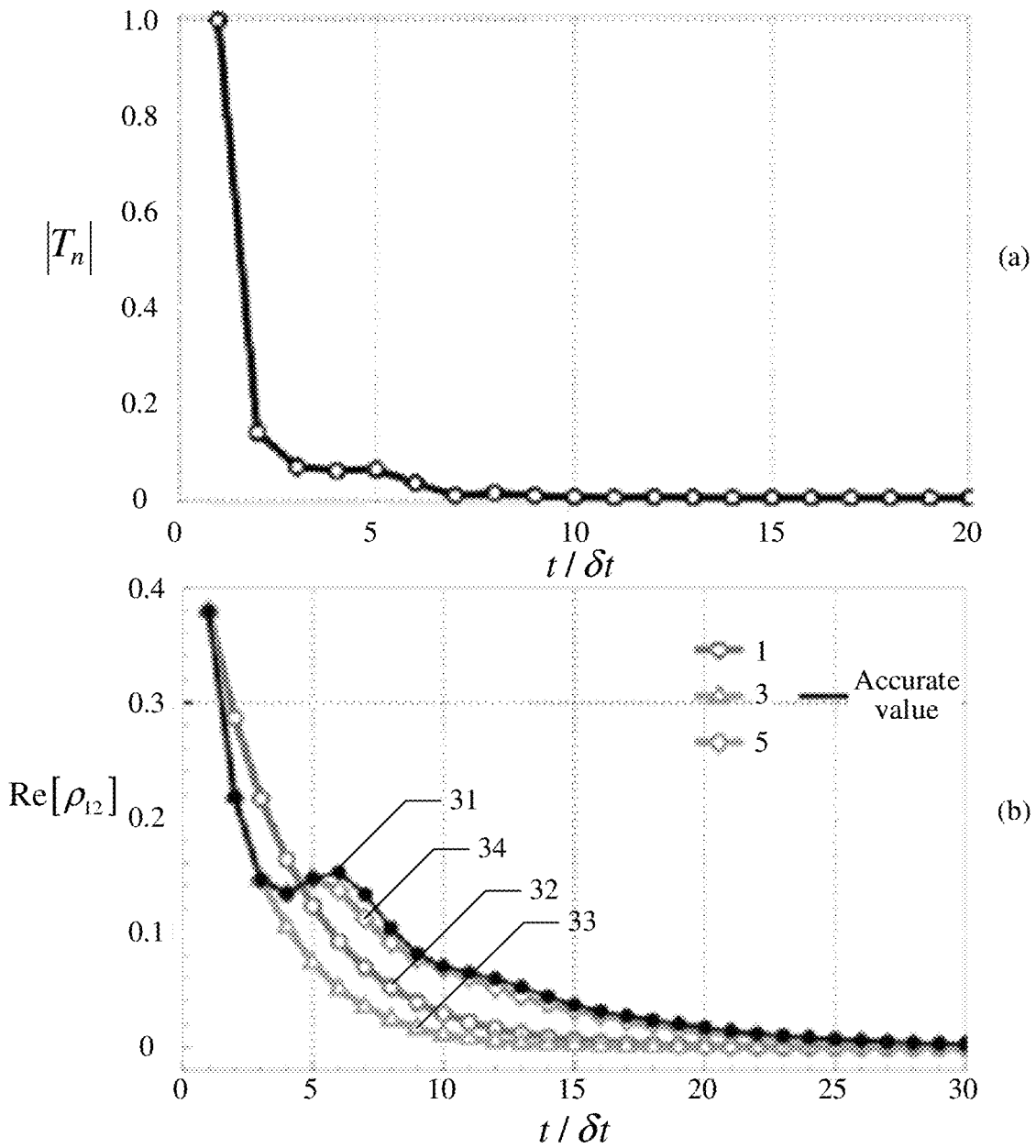
FIG. 3 to FIG. 8 exemplarily show schematic diagrams of several groups of experimental results in a simulated bath.

Letting $H_s = 0.1 \sigma_z$, $H_{sb} = B^z(t) \sigma^z$, $C_{zz}(0) = \lambda = 4$, $\delta t = 0.2$, TTM results of a free evolution of a single qubit are as shown in FIG. 3. Part (a) in FIG. 3 shows the variation of a Frobenius norm of the TTM over time. It may be seen from the figure that the TTM within a range $t_1 \to t_6$ makes a non-trivial contribution, that is, non-Markov properties are demonstrated in the noise process. A line 31 in part (b) in FIG. 3 represents an evolution of a real part of a non-diagonal element of a density matrix corresponding to an initial state $(|0\rangle + |1\rangle)/\sqrt{2}$ over time. A line 32, a line 33 and a line 34 respectively present prediction effects for the density matrix at different TTM lengths (that is, when K is 1, 3, and 5 respectively). It may be seen that when K is 5, an evolution obtained through the TTM well coincides with an exact solution, and a long-term experimental evolution can be perfectly predicted.

Figure 4:
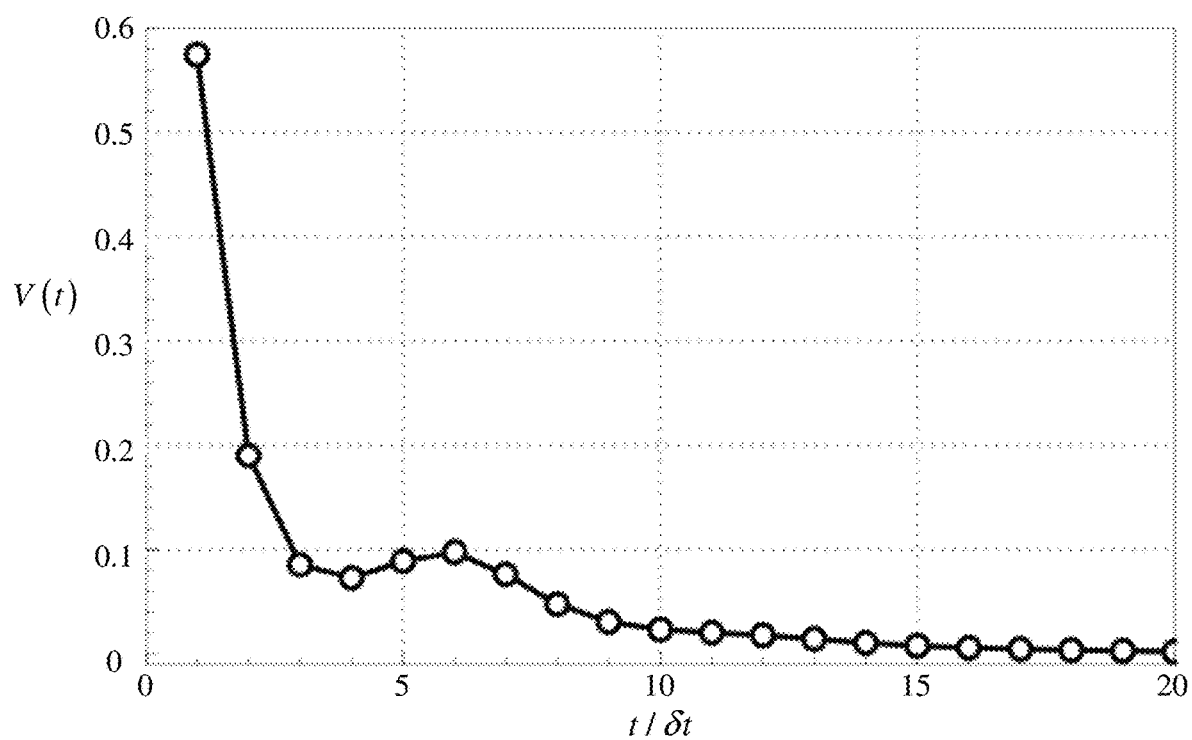

Additionally, FIG. 4 shows the variation of a Bloch volume over time, and the increase in the Bloch volume $V(t)$ within a period of time ($t_4$, $t_5$, $t_6$) demonstrates non-Markov properties of the dynamical process, which proves the conclusion in FIG. 3 from another perspective.

Figure 5:
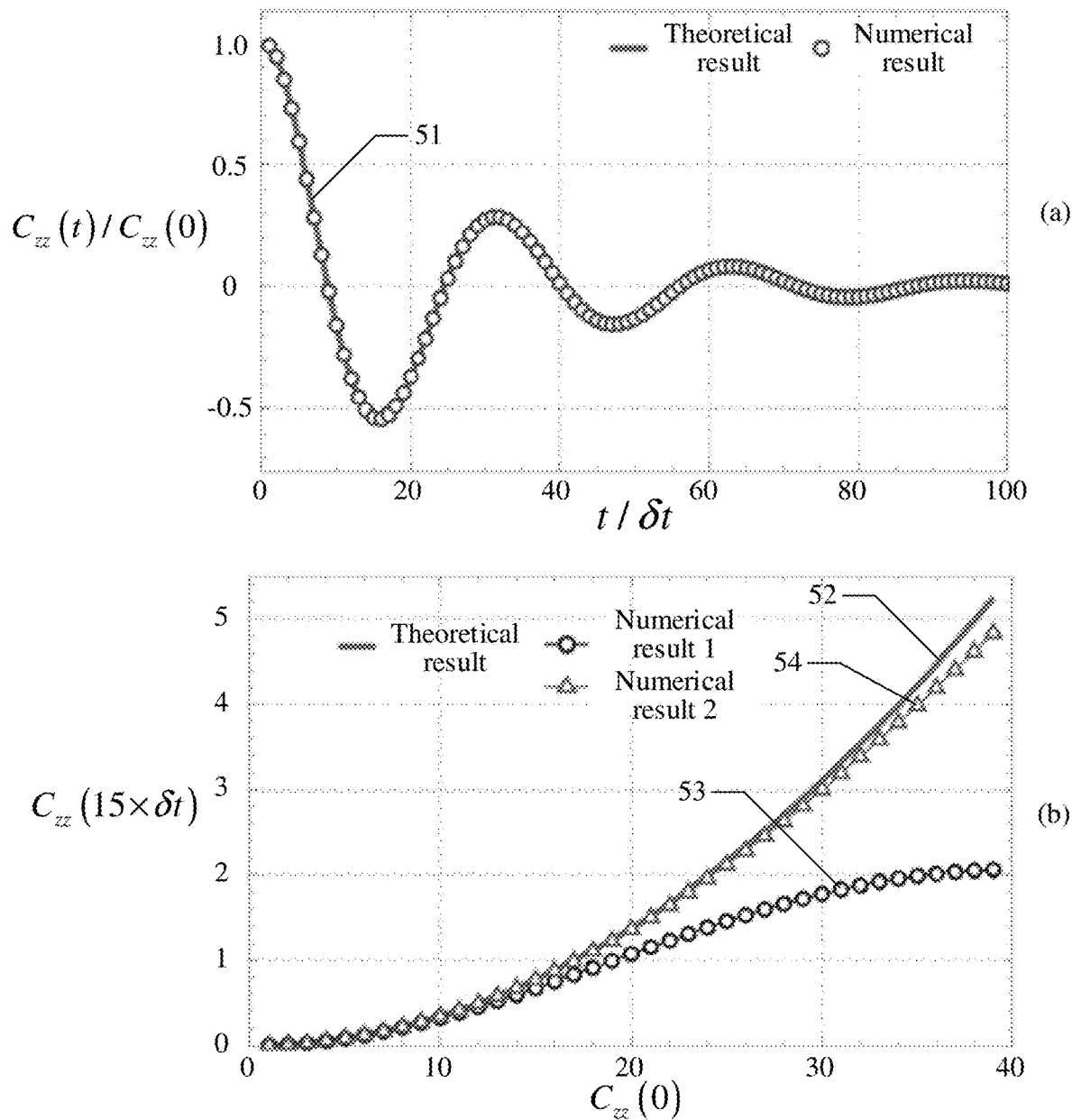

Case 2: Extraction of a Noise Correlation Function of a Single Qubit Under Pure Phase Decoherence Letting $H_s = 0.02 \sigma_z$, $C_{zz}(0) = \langle B^z(t) B^z(0) \rangle = 0.01$, $\delta t = 0.04$, and a frequency spectrum of a quantum noise process (equivalent to a bath noise spectrum) is obtained through a TTM method for a free evolution of a single qubit. Part (a) in FIG. 5 shows the variation of a noise correlation function $C_{zz}(t)$ over time in the case of weak coupling between the quantum system and the bath. A line 51 presents an accurate theoretical result of the noise correlation function, and each circle presents a numerical result obtained from a memory kernel under an assumption of $K(t) \approx K_2(t)$. It can be learned that in the case of weak coupling, an approximate second-order memory kernel obtained from TTM can well depict the quantum noise process.

In part (b) in FIG. 5, let $H_s = 0.02 \sigma_z$, $C_{zz}(0) \in (0, 2.56)$, $\delta t = 0.04$. In the case of strong coupling between the quantum system and the bath, a noise correlation function at a special time point $C_{zz}(t = 15 \delta t)$ changes with a coupling strength $C_{zz}(0) = \lambda$ between the noise and the system. Line 52 represents an accurate theoretical result. Line 53 presents a first numerical result: that is, directly assuming $K(t) \approx K_2(t)$, it can be learned that in the case of strong coupling, there is a big difference between the first numerical result and a real noise spectrum. Line 54 presents a second numerical result: that is, directly assuming $K(t) \approx K_2(t) + K_4(t)$, even in the case of strong coupling under research, a memory kernel obtained from TTM can well reflect the real noise spectrum even for higher order.

Figure 6:
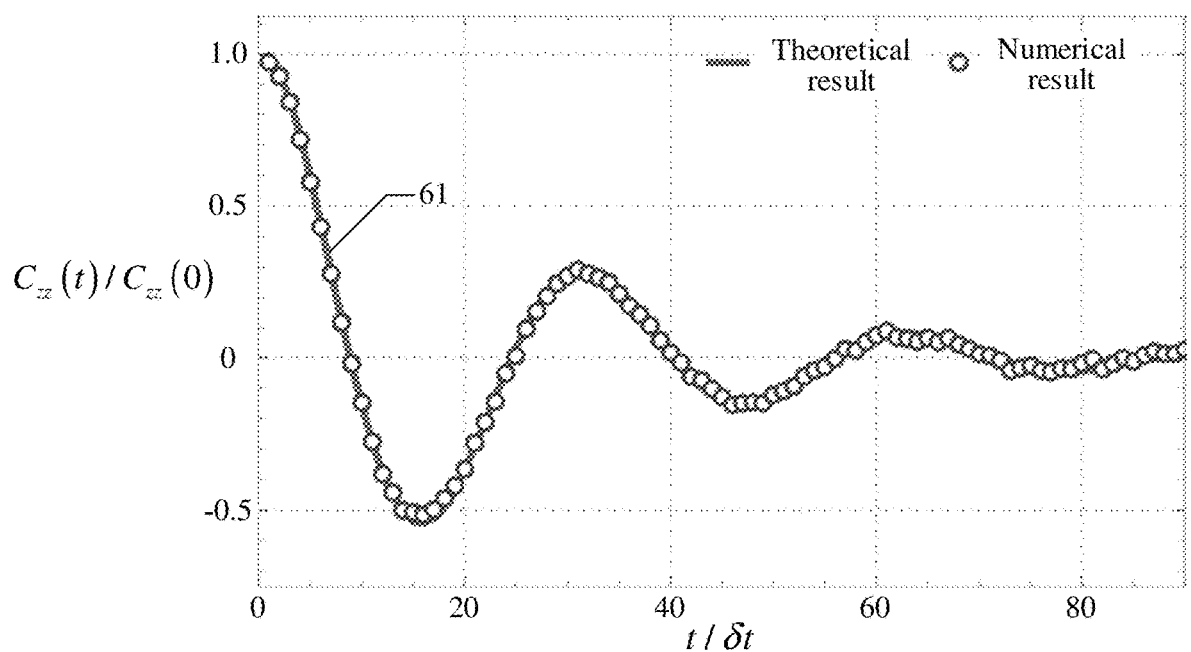

Case 3: Extraction of a Correlation Function of a Single Qubit in a Bit Flip Noise Letting $H_s = 0.02 \delta_z$, $C_{xx}(0) = 0.01$, $\delta t = 0.04$, a frequency spectrum of a quantum noise process (equivalent to a bath noise spectrum) is obtained through a TTM method for a free evolution of a single qubit. In this case, the noise is no longer a pure phase decoherence noise. As shown in FIG. 6, a correlation function $C_{xx}(t) = \langle B^x(t) B^x(0) \rangle$ presented by a circle which is obtained from a memory kernel of a TTM well coincides with a real noise spectrum presented by line 61. This group of simulation indicates that when the influence of the bath noise exceeds that of pure dephasing, for example, $B^x(t)$, $B^y(t)$, the method of deducing a noise spectrum from a memory kernel of a TTM is still applicable.

Figure 7:
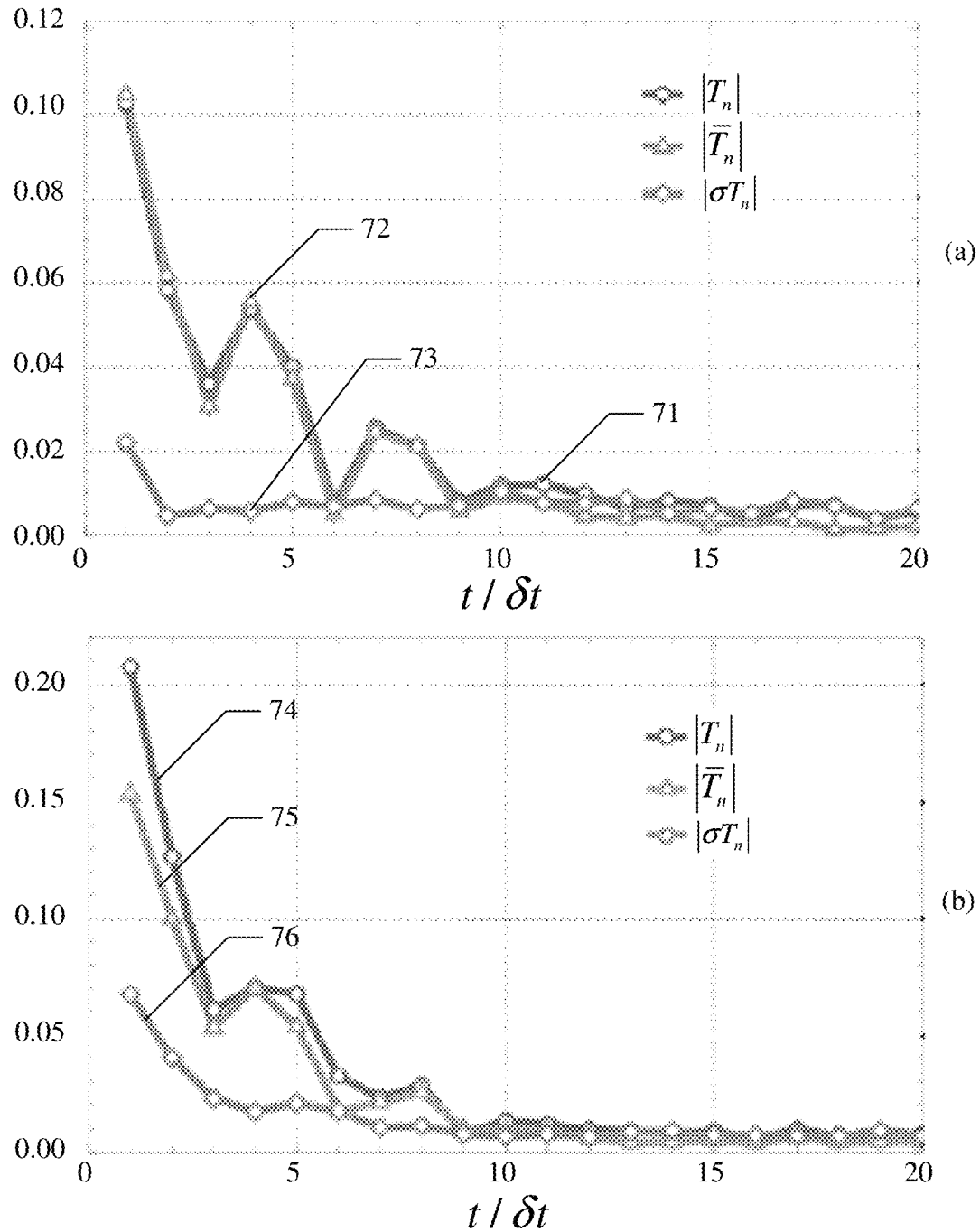

Case 4: TTM Results of Free Evolutions of Two Qubits in Two Double-Qubit Pure Dephasing Models Part (a) in FIG. 7 shows TTM results of free evolutions of two qubits coupled to each other in a direction z when the two qubits are located in respective independent bath noises.

A system Hamiltonian is: $H_s = \omega_1 \sigma_1^z + \omega_2 \sigma_2^z + \omega_{12} \sigma_1^z \omega_2^z$, $\omega_1 = \omega_2 = 0.1$, $\omega_{12} = 0.05$.

A bath Hamiltonian is: $H_{sb} = B_1^z(t) \sigma_1^z + B_2^z(t) \sigma_2^z$,

A correlation function is: $C_{zz}(0) \langle (B_1^z(t) B_1^z(0) \rangle = \langle B_2^z(t) B_2^z(0) \rangle = 1$, $\langle B_1^z(t) B_2^z(t') \rangle = 0$, $\delta t = 0.2$.

Line 71, line 72 and line 73 represent a full TTM $T_n$, a separable TTM $\overline{T}_n$ and a correlated TTM $\delta T_n$, respectively. As shown in the figure, only the first item, that is, $\delta T_1$, in the correlated TTM is non-trivial. The result indicates that in an independent noise bath, a correlated part of a TTM is almost Markovian. Further, it can be learned through analysis that an entanglement of two qubits generated by $\delta L_s$ leads to a correlated decoherence effect even if noise sources are separated or independent of each other in space.

Part (b) in FIG. 7 shows TTM results of free evolutions of two qubits not directly coupled to each other when the two qubits are located in correlated bath noises.

A system Hamiltonian is: $H_s=\omega_1\sigma_1^z+\omega_2\sigma_2^z$, $\omega_1=\omega_2=0.1$ A bath Hamiltonian is:

$H_{sb}=B_1^z(t)\sigma_1^z+B_2^z(t)\sigma_2^z, C_{zz}(0)=\langle B_1^z(t)B_1^z(0)\rangle =$
$\langle B_2^z(t)B_2^z(0)\rangle =\langle B_1^z(t)B_2^z(t')\rangle =1, \delta t=0.2$.

Line 74, line 75 and line 76 represent a full TTM $T_n$, a separable TTM $T_n$ and a correlated TTM $\delta T_n$, respectively. In this case, a plurality of $\delta T_n$ are non-trivial. It may be found through analysis that $\delta K(t_1)$ is the main contributing factor of $\delta T_1$. Therefore, relative importance of different physical mechanisms that cause collective decoherence can be estimated directly according to the norm distribution of TTMs over time.

Figure 8:
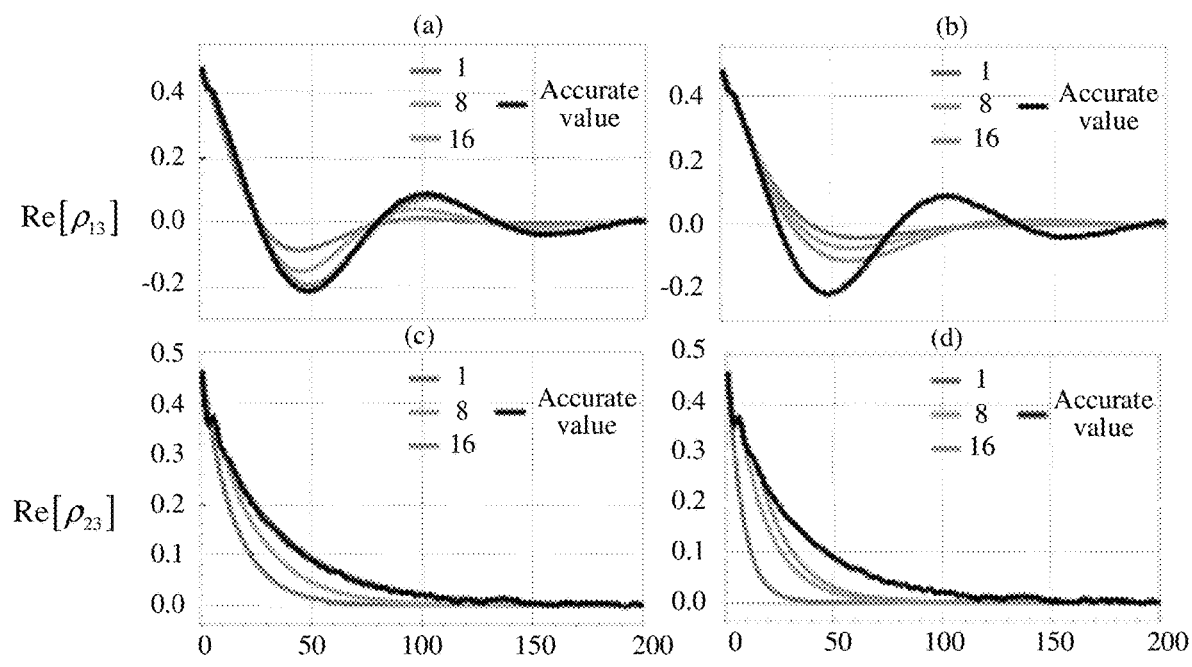

Case 5: Prediction Effectiveness of Dynamics of an Open System of Double-Qubit TTMs To investigate the importance of $\delta T_n$, FIG. 8 presents a dynamical evolution of non-diagonal matrix elements of a density matrix of two qubits. Prediction results of TTMs whose lengths are (that is, K is) 1, 8, and 16 in a physical state are compared with a real dynamical simulation result. Parts (a) and (b) in FIG. 8 respectively present prediction results for $|\psi(0)\rangle=(|00\rangle+|10\rangle)/\sqrt{2}$ based on a full TTM and a separable TTM in a first model. Parts (c) and (d) in FIG. 8 respectively present prediction results for $|\psi(0)\rangle=(|01\rangle+|10\rangle)/\sqrt{2}$ based on a full TTM and a separable TTM in a second model. In both the two cases, the effect of collective decoherence cannot be described by using $T_n$ alone. In FIG. 7, $\delta T_n$ is very small, and has little influence. However, as can be seen from FIG. 8, $\delta T_n$ still plays an important role in the prediction of the physical state. This further proves the complex characteristics of a highly non-Markovian system.

Additionally, to verify the practicability of the technical solution of this disclosure, tests have been conducted on IBM Quantum Experience. IBM Quantum Experience is a superconducting quantum computing cloud platform provided by IBM, and all computations are run on a real superconducting quantum computer. For a superconducting qubit, because the time for operating a quantum gate is too long (about 100 ns) relative to the correlation time of the bath and the noise process is not pure phase decoherence, the method of extracting a frequency spectrum based on dynamical decoupling of CPMG is inapplicable.

Figure 9:
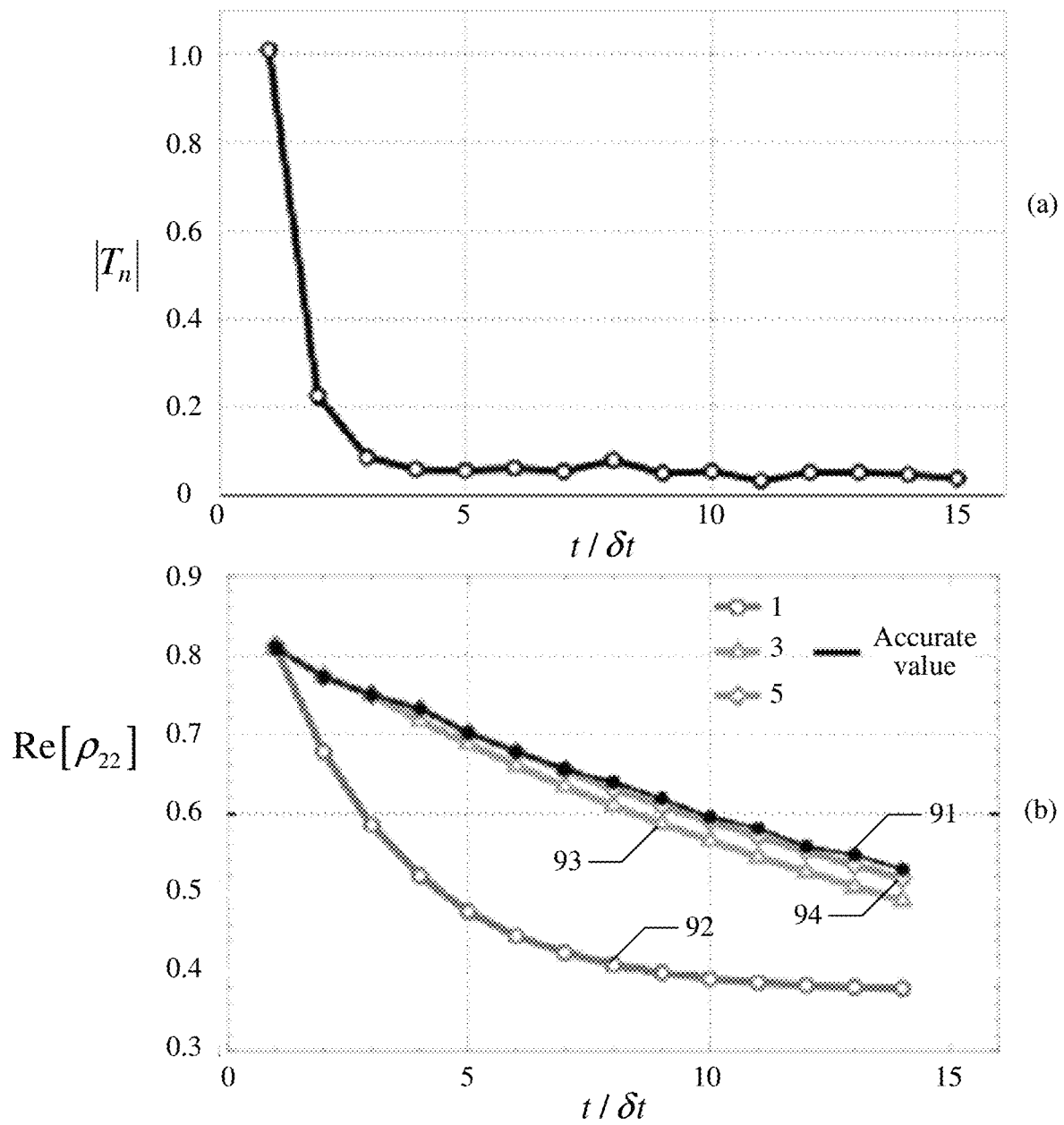
FIG. 9 to FIG. 14 exemplarily show schematic diagrams of several groups of experimental results in a real bath.

FIG. 9 shows research on TTMs of a free evolution of a single qubit on an IBM quantum computing cloud platform "IBM 16 Melbourne", where $\delta t=2.2$ μs. Part (a) in FIG. 9 shows the norm distribution of TTMs over time. Part (b) in FIG. 9 shows a dynamical evolution of a state $|1\rangle$, and line 91 is an experimental result. Line 92, line 93 and line 94 are respective prediction results for an evolution of $|1\rangle$ when (1, 3, and 5) TTMs are taken respectively. It may be seen that the time scale of the memory kernel is in the order of magnitude of μs, which is not short compared with the quantum gate time of 100 ns.

Figure 10:
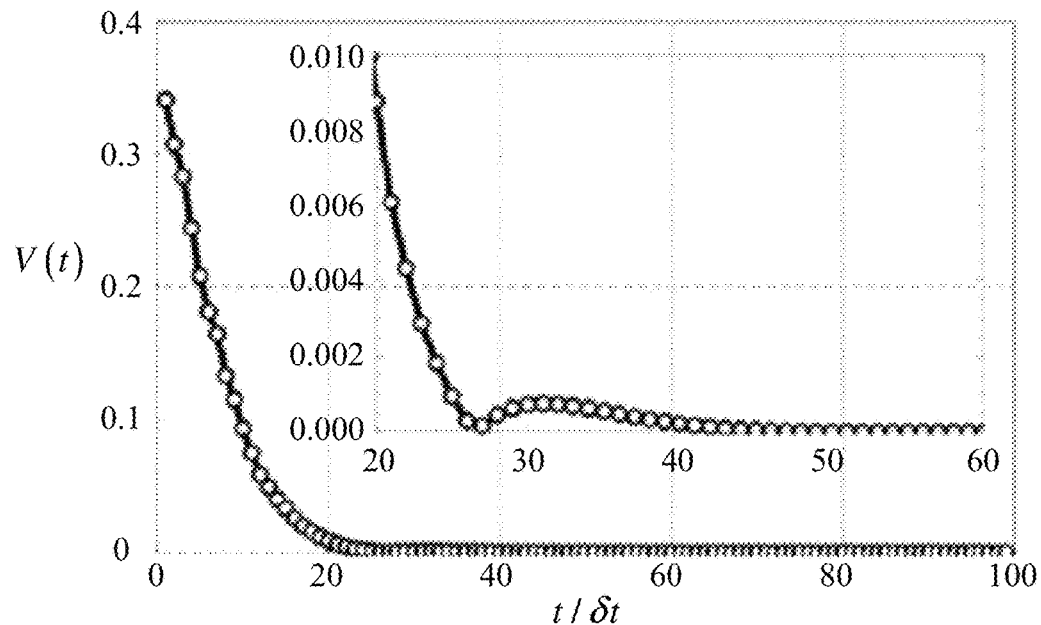

FIG. 10 shows the distribution of a Bloch volume V(t) of a single qubit over time. A transient increase demonstrates the non-Markov characteristics of the quantum system.

Figure 11:
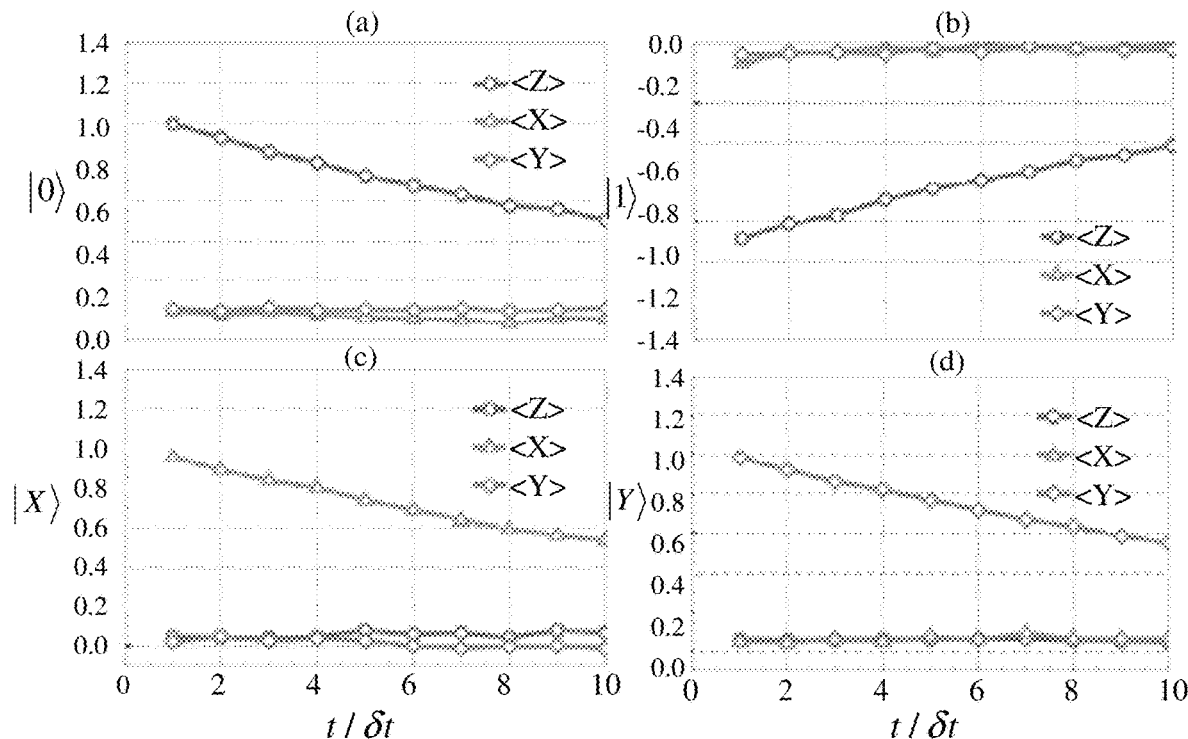

FIG. 11 shows a dynamic decoupling (DD) evolution of a single qubit on an IBM quantum computing cloud platform "IBM 16 Melbourne", where $\delta t=2.64$ μs. Measurement results of four initial states (a) $|\psi(0)\rangle=|0\rangle$, (b) $|\psi(0)\rangle=|1\rangle$, (c) $|\psi(0)\rangle=(|0\rangle+|1\rangle)/\sqrt{2}$ and (d) $|\psi(0)\rangle=(|0\rangle+i|1\rangle)/\sqrt{2}$ in three spinning directions under the XY4DD protocol are shown. Extension of quantum coherence may be observed.

Figure 12:
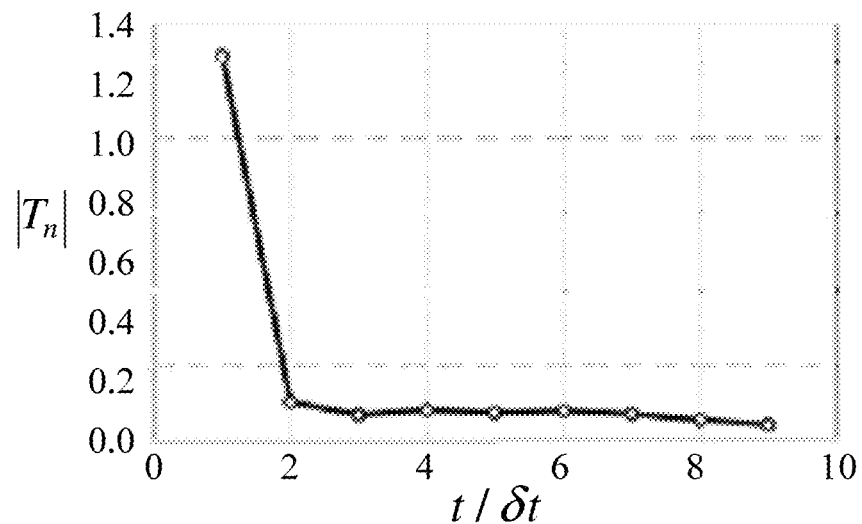

FIG. 12 shows a dynamic decoupling (DD) evolution of a single qubit on an IBM quantum computing cloud platform "IBM 16 Melbourne", where $\delta t=2.64$ μs. The norm distribution of TTMs over time under the XY4DD protocol is shown. An internal mechanism of extension of quantum coherence may be reflected by this TTM: an effective noise under the XY4DD protocol is more Markovian than a result of a free evolution.

Figure 13:
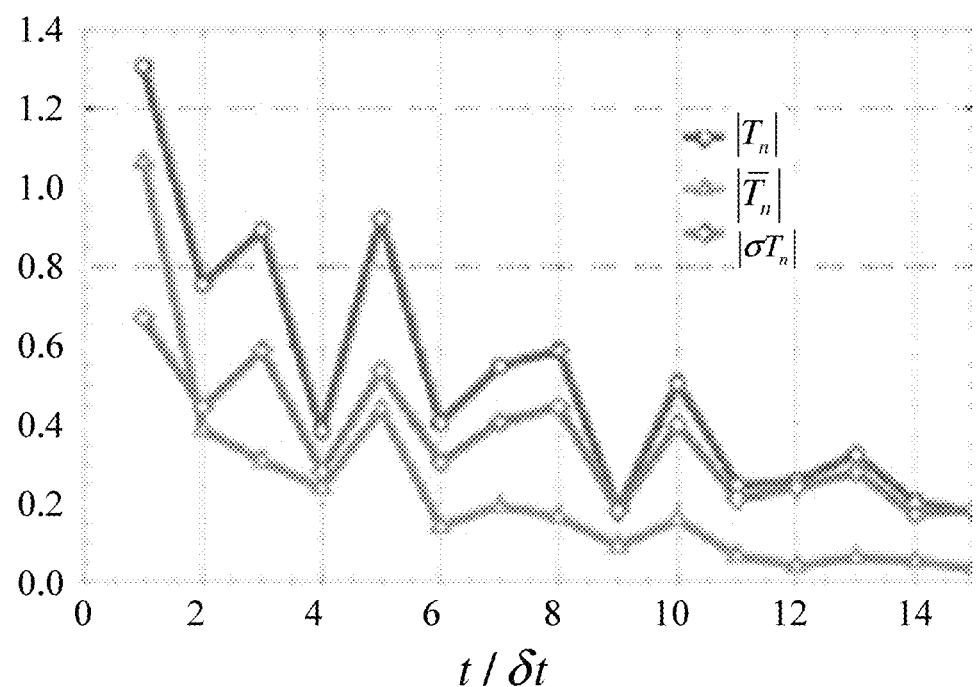

FIG. 13 shows research on a TTM of a free evolution of two qubits on an IBM quantum computing cloud platform "IBM 16 Melbourne", where $\delta t=2.2$ μs. The norm distribution of a full TTM $|T_n|$, a separable TTM $|T_n|$, and a correlated TTM $|\delta T_n|$ over time is shown. It may be seen that in this group of experiments, the TTMs are all non-trivial in a relatively long time scale, and have relatively strong non-Markov properties. With reference to the result of numerical simulation, it may be preliminarily considered that there are inter-bit coupling and a bath noise correlation between two neighboring bits on the IBM quantum cloud platform.

Figure 14:
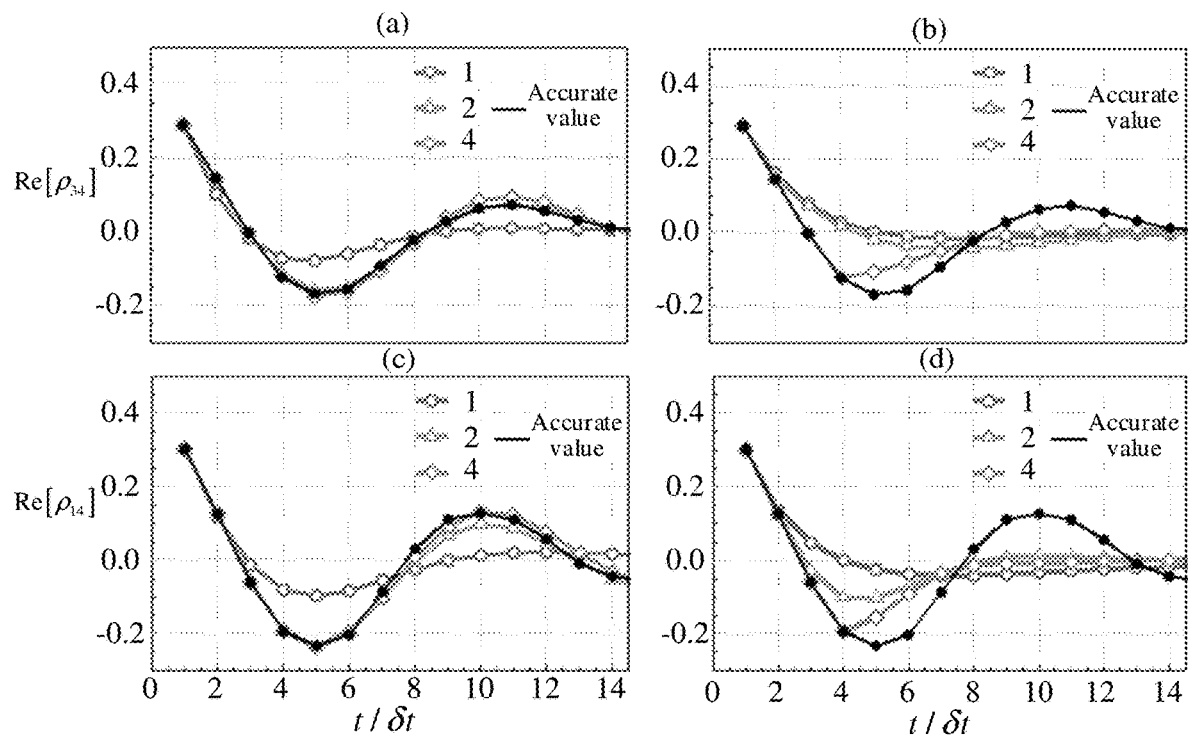

FIG. 14 shows research on TTMs of free evolutions of two qubits on an IBM quantum computing cloud platform "IBM 16 Melbourne", where $\delta t=2.2$ μs. The black line with black dots is an experimental result of an evolution of a density matrix, and three lines represented with circles, triangles and squares are respectively results of predicting an evolution of a density matrix by selecting (1, 2, and 4) TTMs respectively. Parts (a) and (b) in FIG. 14 respectively present prediction results based on a full TTM and a separable TTM when the initial state is a non-entangled state $|\psi(0)\rangle=(|11\rangle+|10\rangle)/\sqrt{2}$. Parts (c) and (d) in FIG. 14 respectively present prediction results based on a full TTM and a separable TTM when an initial state is an entangled state $|\psi(0)\rangle=(|00\rangle+|11\rangle)/\sqrt{2}$. It can be learned that if no correlated TTM is included, the evolution cannot be accurately predicted either in the entangled state or in the non-entangled state. Through a further analysis of $\delta T_1$, it may be seen that $\delta L_s$ makes an important contribution, indicating that the two qubits are coupled to each other.

The following is an apparatus embodiment of this disclosure, which can be used to execute the method embodiments of this disclosure. For details that are not disclosed in the apparatus embodiments of this disclosure, refer to the method embodiments of this disclosure.

Figure 15:
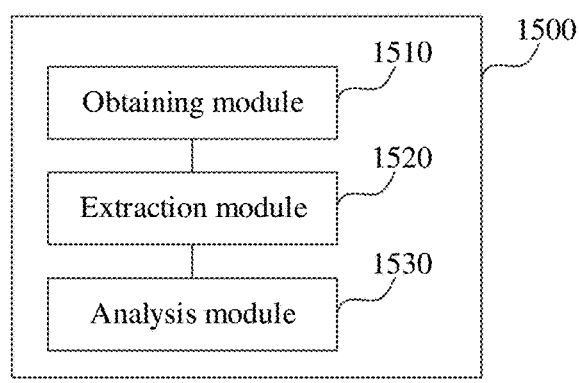
FIG. 15 is a block diagram of a quantum noise process analysis apparatus according to an embodiment of this disclosure.

FIG. 15 is a block diagram of a quantum noise process analysis apparatus according to an embodiment of this disclosure. The apparatus has functions of implementing the foregoing method embodiments. The functions may be implemented by hardware, or may be implemented by hardware executing corresponding software. The apparatus may be a computer device, or may be disposed in a computer device. The apparatus 1500 may include: an obtaining module 1510, an extraction module 1520, and an analysis module 1530.

The obtaining module 1510 is configured to perform quantum process tomography (QPT) on a quantum noise process of a target quantum system, to obtain dynamical maps of the quantum noise process.

The extraction module 1520 is configured to extract TTMs of the quantum noise process from the dynamical maps, the TTMs being used for representing a dynamical evolution of the quantum noise process.

The analysis module 1530 is configured to analyze the quantum noise process according to the TTMs.

To sum up, in the technical solutions provided in this disclosure, QPT is performed on a quantum noise process, to obtain dynamical maps of the quantum noise process, and a TTM of the quantum noise process is further extracted from the dynamical maps of the quantum noise process. The TTM is used for representing a dynamical evolution of the quantum noise process, that is, reflecting the law of evolution of the dynamical maps of the quantum noise process over time. Compared with pure QPT, this disclosure can obtain richer and more comprehensive information about the quantum noise process. Therefore, when the quantum noise process is analyzed based on the TTM of the quantum noise process, a more accurate and comprehensive analysis of the quantum noise process can be achieved based on the richer and more comprehensive information.

In some possible designs, the dynamical maps include dynamical maps of the quantum noise process at K time points, K being a positive integer; and the extraction module 1520 is configured to calculate TTMs of the quantum noise process at the K time points according to the dynamical maps of the quantum noise process at the K time points.

In some possible designs, the extraction module 1520 is configured to calculate a TTM $T_n$ of the quantum noise process at an $n^{th}$ time point according to the following formula:

$$T_n \equiv \mathcal{E}_n - \sum_{m=1}^{n-1} T_{n-m}\mathcal{E}_m,$$

where $T_1 = \mathcal{E}_1$, $\mathcal{E}_n$ represents a dynamical map of the quantum noise process at the $n^{th}$ time point, $\mathcal{E}_m$ in represents a dynamical map of the quantum noise process at an $m^{th}$ time point, and $T_{n-m}$ represents a TTM of the quantum noise process at an $(n-m)^{th}$ time point, both n and m being positive integers.

Figure 16:
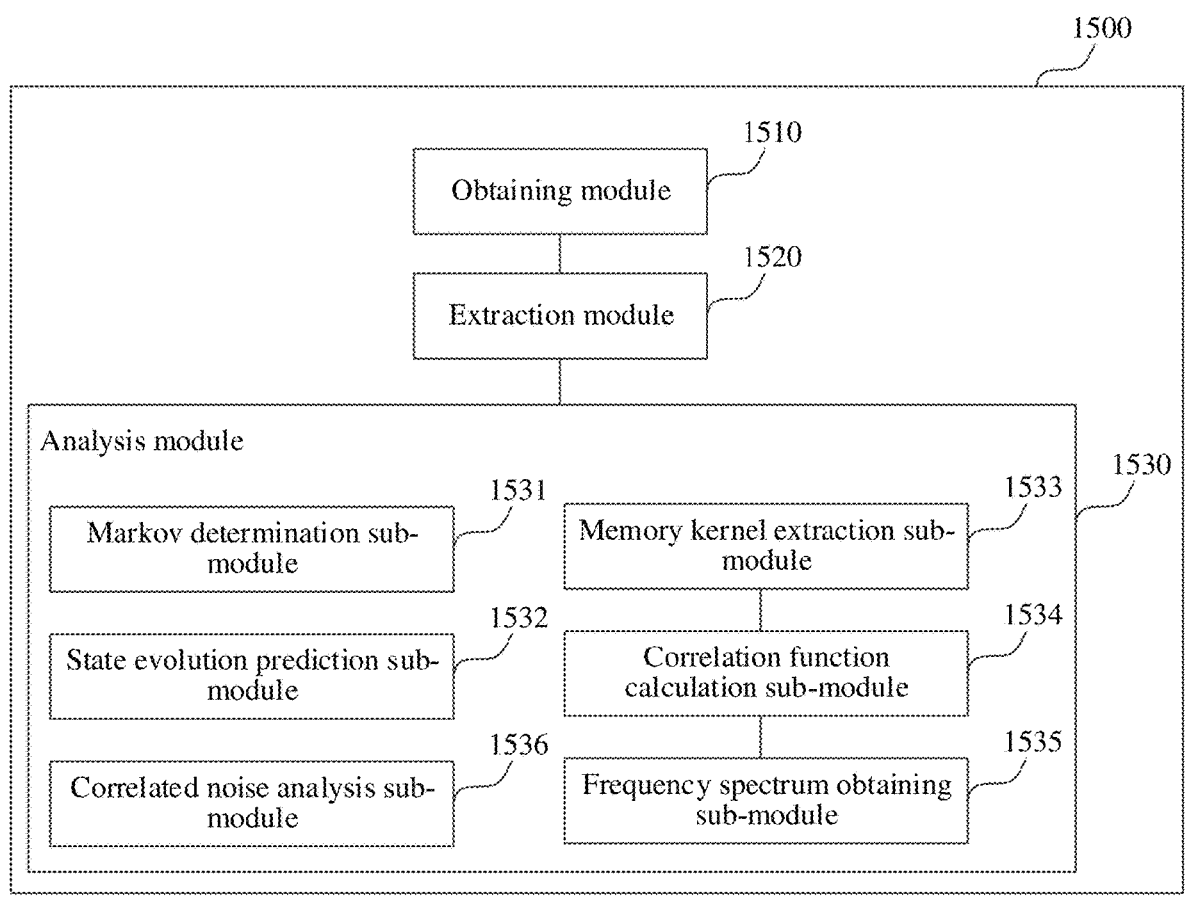
FIG. 16 is a block diagram of a quantum noise process analysis apparatus according to another embodiment of this disclosure.

In some possible designs, as shown in FIG. 16, the analysis module 1530 includes a Markov determination sub-module 1531.

The Markov determination sub-module 1531 is configured to:

determine that the quantum noise process is a Markov process when each of moduli of TTMs of the quantum noise process at first time points is less than a preset threshold, the first time points being time points other than the foremost time point of the K time points; and determine that the quantum noise process is a non-Markov process when a modulus of a TTM of the quantum noise process at a second time point is greater than the preset threshold, the second time point being at least one time point other than the foremost time point of the K time points.

In some possible designs, as shown in FIG. 16, the analysis module 1530 includes a state evolution prediction sub-module 1532.

The state evolution prediction sub-module 1532 is configured to predict a state evolution of the quantum noise process within a subsequent time according to the TTMs at the K time points.

In some possible designs, the state evolution prediction sub-module 1532 is configured to calculate a quantum state $\rho(t_n)$ of the quantum noise process at an $n^{th}$ time point $t_n$ according to the following formula:

$$\rho(t_n) = \sum_{m=1}^{n-1} T_m \rho(t_{n-m}),$$

where $T_m$ represents a TTM at an $m^{th}$ time point, and $\rho(t_{n-m})$ represents a quantum state at an $(n-m)^{th}$ time point $t_{n-m}$, both n and m being positive integers.

In some possible designs, as shown in FIG. 16, the analysis module 1530 includes:

a memory kernel extraction sub-module 1533, configured to extract a second-order memory kernel of the quantum noise process according to the TTMs when the quantum noise process is a steady noise;

a correlation function calculation sub-module 1534, configured to calculate a correlation function of the quantum noise process according to the second-order memory kernel of the quantum noise process; and a frequency spectrum obtaining sub-module 1535, configured to perform a Fourier transform on the correlation function of the quantum noise process, to obtain a frequency spectrum of the quantum noise process.

In some possible designs, the memory kernel extraction sub-module 1533 is configured to: select N different parameters, perform an experiment on the quantum noise process, and extract memory kernels respectively corresponding to the N different parameters from the experiment; and perform calculation according to the memory kernels respectively corresponding to the N different parameters, to obtain the second-order memory kernel of the quantum noise process.

In some possible designs, the correlation function calculation sub-module 1534 is configured to numerically extract the correlation function $C_{\alpha\alpha'}$ of the quantum noise process according to the following formula:

$$\arg\min_{C_{\alpha\alpha'}(t_n)} \left\{ |\kappa_2(t_n; C_{\alpha\alpha'}(t_n)) - \kappa_{exp}(t_n)| + \left(1 + \delta_{t_n,t_0}\right)\lambda_n \sum_{\alpha\alpha'} |C_{\alpha\alpha'}(t_n) - C_{\alpha\alpha'}(t_{n-1})| \right\},$$

where $\kappa_2$ represents the second-order memory kernel of the quantum noise process, $t_n$ represents the $n^{th}$ time point, $\kappa_{exp}$ is a second-order correlation function at the $n^{th}$ time point, $\kappa_{exp}$ represents an approximate second-order memory kernel obtained through an experiment, $\delta_{t_n,t_0}$ represents an interval between the $n^{th}$ time point and an initial moment, $\lambda_n$ is an adjustable parameter, and $C_{\alpha\alpha'}(t_{n-1})$ is a second-order correlation function at an $(n-1)^{th}$ time point $t_{n-1}$.

In some possible designs, as shown in FIG. 16, the analysis module 1530 includes a correlated noise analysis sub-module 1536.

The correlated noise analysis sub-module 1536 is configured to calculate, for s quantum devices included in the target quantum system, a correlated TTM among the s quantum devices according to TTMs respectively corresponding to the s quantum devices, s being an integer greater than 1; and analyze a source of a correlated noise among the s quantum devices according to the correlated TTM.

When the apparatus provided in the foregoing embodiments implements its functions, a description is given only by using the foregoing division of function modules as an example. In actual applications, the functions may be allocated to and implemented by different function modules according to the requirements, that is, the internal structure of the device may be divided into different function modules, to implement all or some of the functions described above. In addition, the apparatus and method embodiments provided in the foregoing embodiments follow similar underlying principles. For the specific implementation process, refer to the method embodiments, so the details are not described herein again.

Figure 17:
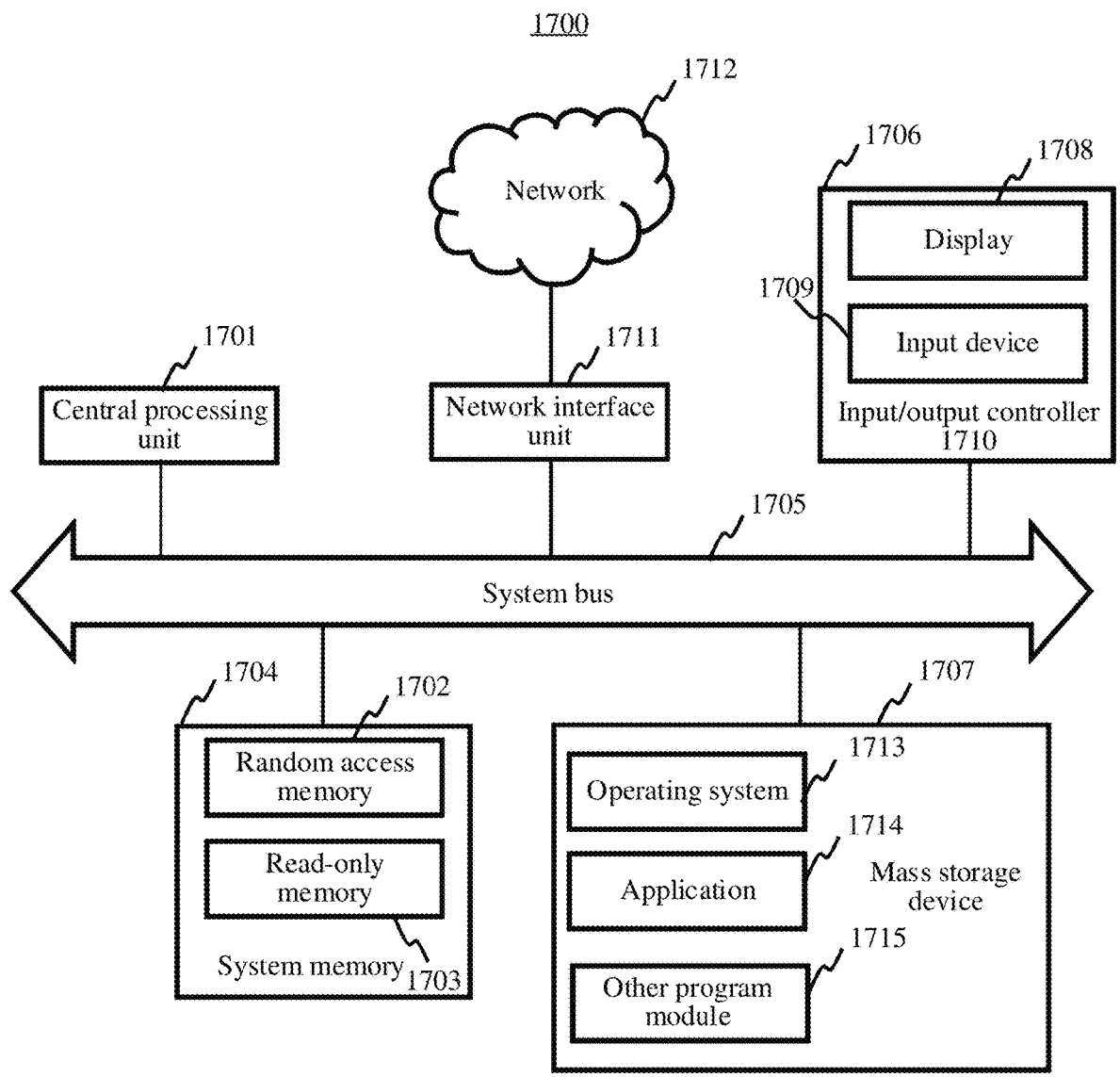
FIG. 17 is a schematic structural diagram of a computer device according to an embodiment of this disclosure.

FIG. 17 is a schematic structural diagram of a computer device according to an embodiment of this disclosure. The computer device is configured to implement the quantum noise process analysis method provided in the foregoing embodiments. Specifically:

The computer device 1700 includes a central processing unit (CPU) 1701, a system memory 1704 including a random access memory (RAM) 1702 and a read-only memory (ROM) 1703, and a system bus 1705 connecting the system memory 1704 and the CPU 1701. The computer device 1700 further includes a basic input/output system (I/O system) 1706 configured to transmit information between components in the computer, and a mass storage device 1707 configured to store an operating system 1713, an application program 1714, and other program module 1715.

The basic I/O system 1706 includes a display 1708 configured to display information and an input device 1709 configured for a user to input information, such as a mouse or a keyboard. The display 1708 and the input device 1709 are both connected to the CPU 1701 by an input/output controller 1710 connected to the system bus 1705. The basic I/O system 1706 may further include the input/output controller 1710, to receive and process inputs from multiple other devices, such as a keyboard, a mouse, or an electronic stylus. Similarly, the input/output controller 1710 further provides an output to a display screen, a printer, or other type of output device.

The mass storage device 1707 is connected to the CPU 1701 by a mass storage controller (not shown) connected to the system bus 1705. The mass storage device 1707 and an associated computer-readable medium provide non-volatile storage for the computer device 1700. That is, the mass storage device 1707 may include a computer-readable medium (not shown), such as a hard disk or a CD-ROM drive.

Without loss of generality, the computer-readable medium may include a computer storage medium and a communication medium. The computer storage medium includes volatile and non-volatile, removable and non-removable media implemented by using any method or technology for storing information such as computer-readable instructions, data structures, program modules, or other data. The computer storage medium includes a RAM, a ROM, an EPROM, an EEPROM, a flash memory, or other solid-state storage technique, a CD-ROM, a DVD, or other optical storage, a magnetic cassette, a magnetic tape, a magnetic disk storage, or other magnetic storage device. Certainly, it is known to a person skilled in the art that the computer storage medium is not limited to the foregoing types. The system memory 1704 and the mass storage device 1707 may be collectively referred to as a memory.

According to the embodiments of this disclosure, the computer device 1700 may further be connected, through a network such as the Internet, to a remote computer on the network. That is, the computer device 1700 may be connected to a network 1712 by a network interface unit 1711 connected to the system bus 1705, or may be connected to another type of network or remote computer system (not shown) by a network interface unit 1711.

The memory stores at least one instruction, at least one section of program, a code set or an instruction set, and the at least one instruction, the at least one section of program, the code set or the instruction set is configured to be executed by one or more processors to implement the quantum noise process analysis method provided in the foregoing embodiments.

In an exemplary embodiment, a computer-readable storage medium is further provided, the storage medium storing at least one instruction, at least one program, a code set or an instruction set, the at least one instruction, the at least one program, the code set or the instruction set being executed by a processor of a computer device to implement the quantum noise process analysis method provided in the foregoing embodiments. In an exemplary embodiment, the computer-readable storage medium may be a ROM, a RAM, a CD-ROM, a magnetic tape, a floppy disk, or an optical data storage device In an exemplary embodiment, a computer program product is provided. When executed, the computer program product is configured to implement the quantum noise process analysis method provided in the foregoing embodiments.

It is to be understood that "plurality of" mentioned in this specification means two or more. "And/or" describes an association relationship between associated objects and means that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution order of the steps. In some other embodiments, the steps may not be performed according to the order of the numbers. For example, two steps denoted by different numbers may be performed simultaneously, or two steps denoted by different numbers may be performed in an order that is reverse to that shown in the figure, which is not limited in the embodiments of this disclosure.

The foregoing descriptions are merely examples of the embodiments of this disclosure, but are not intended to limit this disclosure. Any modification, equivalent replacement, or improvement made without departing from the spirit and principle of this disclosure shall fall within the protection scope of this application.

What is claimed is:

1. A quantum noise process analysis method, applicable to a computer device, the method comprising:
performing quantum process tomography (QPT) on quantum noise processes of a plurality of target quantum devices, to obtain dynamical maps of the quantum noise processes, wherein the QPT involves at least one measurement of each of the plurality of target quantum devices;
extracting transfer tensor maps (TTMs) of the quantum noise processes from the dynamical maps, the TTMs being used for representing a dynamical evolution of the quantum noise processes;
calculating a joint dynamical map of the quantum noise processes;

calculating a correlated TTM among the plurality of target quantum devices according to the TTMs; and the joint dynamical map; and analyzing a source of a correlated noise among the plurality of target quantum devices according to the correlated TTMs.

2. The method according to claim 1, wherein:

the dynamical maps comprise maps of the quantum noise processes at K time points, K being a positive integer; and extracting the TTMs of the quantum noise processes from the dynamical maps comprises:

calculating the TTMs of the plurality of the quantum noise processes at the K time points according to the maps of the quantum noise processes at the K time points.

3. The method according to claim 2, wherein calculating the TTMs of the quantum noise processes at the K time points according to the maps of the quantum noise processes at the K time points comprises:

calculating a TTM $T_n$ of each of the quantum noise processes at an $n^{th}$ time point according to the following formula:

$$T_n \equiv \mathcal{E}_n - \sum_{m=1}^{n-1} T_{n-m} \mathcal{E}_m,$$

wherein $T_1 = \mathcal{E}_1$, $\mathcal{E}_n$ represents a dynamical map of the each of the quantum noise processes at the $n^{th}$ time point, $\mathcal{E}_m$ in represents a dynamical map of the each of the quantum noise processes at an $m^{th}$ time point, and $T_{n-m}$ represents a TTM of the each of the quantum noise processes at an $(n-m)^{th}$ time point, both n and m being positive integers.

4. The method according to claim 2, wherein the TTM of each of the quantum noise processes is separable calculated from other TTMs.

5. The method according to claim 2, wherein the joint dynamical map is determined from the dynamical maps of the quantum noise processes of the plurality of target quantum devices.

6. The method according to claim 5, wherein the joint dynamical map comprises a correlation of the dynamical maps of the quantum noise process of the plurality of target quantum devices.

7. The method according to claim 2, further comprising:

predicting state evolutions of the quantum noise processes within a subsequent time according to the TTMs at the K time points.

8. The method according to claim 7, wherein predicting the state evolutions of the quantum noise processes within the subsequent time according to the TTMs at the K time points comprises:

calculating quantum states $\rho(t_n)$ of the quantum noise processes at an $n^{th}$ time point $t_n$ according to the following formula:

$$\rho(t_n) = \sum_{m=1}^{n-1} T_m \rho(t_{n-m}),$$

wherein $T_m$ represents TTMs at an $m^{th}$ time point, and $\rho(t_{n-m})$ represents quantum states at an $(n-m)^{th}$ time point $t_{n-m}$, both n and m being positive integers.

9. A quantum noise process analysis device, comprising a memory for storing instructions and a processor in communication with the processor, wherein the processor, when executing the instructions, causes the quantum noise process analysis device to:

perform quantum process tomography (QPT) on quantum noise processes of a plurality of target quantum devices, to obtain dynamical maps of the quantum noise processes, wherein the QPT involves at least one measurement of each of the plurality of target quantum devices;

extract transfer tensor maps (TTMs) of the quantum noise processes from the dynamical maps, the TTMs being used for representing a dynamical evolution of the quantum noise processes;

calculate a joint dynamical map of the quantum noise processes;

calculate a correlated TTM among the plurality of target quantum devices according to the TTMs; and the joint dynamical map; and analyze a source of a correlated noise among the plurality of target quantum devices according to the correlated TTMs.

10. The quantum noise process analysis device according to claim 9, wherein the dynamical maps comprise maps of the quantum noise processes at K time points, K being a positive integer, and the processor, when executing the instructions to extract the TTMs of the quantum noise processes, is configured cause the quantum noise process analysis device to:

calculate the TTMs of the plurality of the quantum noise processes at the K time points according to the maps of the quantum noise processes at the K time points.

11. The quantum noise process analysis device according to claim 10, wherein the processor, when executing the instructions to calculate the TTMs of the quantum noise processes at the K time points according to the maps of the quantum noise processes at the K time points, is configured to cause quantum noise process analysis device to:

calculate a TTM $T_n$ of each of the quantum noise processes at an $n^{th}$ time point according to the following formula:

$$T_n \equiv \mathcal{E}_n - \sum_{m=1}^{n-1} T_{n-m} \mathcal{E}_m,$$

wherein $T_1 = \mathcal{E}_1$, $\mathcal{E}_n$ represents a dynamical map of the each of the quantum noise processes at the $n^{th}$ time point, $\mathcal{E}_m$ represents a dynamical map of the each of the quantum noise processes at an $m^{th}$ time point, and $T_{n-m}$ represents a TTM of the each of the quantum noise processes at an $(n-m)^{th}$ time point, both n and m being positive integers.

12. The quantum noise process analysis device according to claim 10, wherein the TTM of each of the quantum noise processes is separable calculated from other TTMs.

13. The quantum noise process analysis device according to claim 10, wherein the joint dynamical map is determined from the dynamical maps of the quantum noise processes of the plurality of target quantum devices.

14. The quantum noise process analysis device according to claim 13, wherein the joint dynamical map comprises a correlation of the dynamical maps of the quantum noise process of the plurality of target quantum devices.

15. The quantum noise process analysis device according to claim 10, wherein the processor is further configured to execute instructions to cause the quantum noise process analysis device to:

predict state evolutions of the quantum noise processes within a subsequent time according to the TTMs at the K time points.

16. The quantum noise process analysis device according to claim 15, wherein, the processor, when executing the instructions to predict the state evolutions of the quantum noise processes within the subsequent time according to the TTMs at the K time points, is configured to cause the quantum noise process analysis device to:

calculate quantum states $\rho(t_n)$ of the quantum noise processes at an $n^{th}$ time point $t_n$ according to the following formula:

$$\rho(t_n) = \sum_{m=1}^{n-1} T_m \rho(t_{n-m}),$$

wherein $T_m$ represents TTMs at an $m^{th}$ time point, and $\rho(t_{n-m})$ represents quantum states at an $(n-m)^{th}$ time point $t_{n-m}$, both n and m being positive integers.

17. A non-transitory computer-readable medium for storing instructions, wherein the instructions when executed by a processor, cause the processor to:

perform quantum process tomography (QPT) on quantum noise processes of a plurality of target quantum devices, to obtain dynamical maps of the quantum noise processes, wherein the QPT involves at least one measurement of each of the plurality of target quantum devices;

extract transfer tensor maps (TTMs) of the quantum noise processes from the dynamical maps, the TTMs being used for representing a dynamical evolution of the quantum noise processes;

calculate a joint dynamical map of the quantum noise processes;

calculate a correlated TTM among the plurality of target quantum devices according to the TTMs; and the joint dynamical map; and analyze a source of a correlated noise among the plurality of target quantum devices according to the correlated TTMs.

18. The non-transitory computer-readable medium according to claim 17, wherein the TTM of each of the quantum noise processes is separable calculated from other TTMs.

19. The non-transitory computer-readable medium according to claim 17, wherein the joint dynamical map is determined from the dynamical maps of the quantum noise processes of the plurality of target quantum devices.

20. The non-transitory computer-readable medium according to claim 18, wherein the joint dynamical map comprises a correlation of the dynamical maps of the quantum noise process of the plurality of target quantum devices.

* * * * *